US00RE50836E

(19) United States
(12) Reissued Patent
Liu et al.

(10) Patent Number: US RE50,836 E
(45) Date of Reissued Patent: Mar. 17, 2026

(54) IMAGE CAPTURE MODE ADAPTATION

(71) Applicant: QUALCOMM Incorporated, San Diego, CA (US)

(72) Inventors: Shizhong Liu, San Diego, CA (US); Hailong Wang, San Diego, CA (US); Wan Shun Vincent Ma, San Diego, CA (US)

(73) Assignee: QUALCOMM Incorporated, San Diego, CA (US)

(21) Appl. No.: 18/139,154

(22) Filed: Apr. 25, 2023

Related U.S. Patent Documents

Reissue of:
(64) Patent No.: 11,218,641
Issued: Jan. 4, 2022
Appl. No.: 16/667,662
Filed: Oct. 29, 2019

U.S. Applications:
(60) Provisional application No. 62/897,697, filed on Sep. 9, 2019.

(51) Int. Cl.
*H04N 23/69* (2023.01)
*H04N 23/45* (2023.01)
(Continued)

(52) U.S. Cl.
CPC ..... *H04N 23/69* (2023.01); *H04N 23/45* (2023.01); *H04N 23/58* (2023.01); *H04N 23/667* (2023.01)

(58) Field of Classification Search
CPC ..... H04N 23/69; H04N 23/45; H04N 23/58; H04N 23/667; H04N 25/42; H04N 25/44; H04N 25/443; H04N 25/46
See application file for complete search history.

(56) References Cited

U.S. PATENT DOCUMENTS 7,733,389 B2 6/2010 Kurosawa et al.
8,363,120 B2 1/2013 Shioji
(Continued)

FOREIGN PATENT DOCUMENTS

JP 2004072278 A 3/2004
JP 2006115117 A 4/2006
(Continued)

OTHER PUBLICATIONS

International Preliminary Report on Patentability—PCT/US2020/070391—The International Bureau of WIPO—Geneva, Switzerland—Mar. 17, 2022.
(Continued)

*Primary Examiner* — Mark Sager
(74) *Attorney, Agent, or Firm* — QUALCOMM Incorporated

(57) ABSTRACT

In general, techniques are described regarding adaptation of image capture modes to provide refined image capture capabilities. Cameras comprising image sensors configured to perform the techniques are also disclosed. An image sensor may use different image capture modes to capture frames of image data based at least in part on various operating conditions. For example, the processor can cause an image sensor to transition between image capture modes specifying different binning levels in the case that a digital zoom level satisfies a predefined threshold.

41 Claims, 12 Drawing Sheets

(51) Int. Cl.
*H04N 23/58* (2023.01)
*H04N 23/667* (2023.01)

(56) References Cited

U.S. PATENT DOCUMENTS

| | | | | |
|---|---|---|---|---|
| 9,215,378 | B2 | 12/2015 | Yatabe et al. | |
| 9,307,161 | B2 | 4/2016 | Lee et al. | |
| 11,218,641 | B2 | 1/2022 | Liu et al. | |
| 2004/0095485 | A1* | 5/2004 | Ueda | H04N 9/04561 348/240.1 |
| 2006/0221213 | A1* | 10/2006 | Watanabe | H04N 5/2628 348/240.3 |
| 2006/0275025 | A1* | 12/2006 | Labaziewicz | H04N 5/2254 396/72 |
| 2014/0118577 | A1 | 5/2014 | Masuda | |
| 2018/0114308 | A1* | 4/2018 | Herrmann | G06T 7/0004 |

FOREIGN PATENT DOCUMENTS

| | | | |
|---|---|---|---|
| JP | 5147664 | B2 | 2/2013 |
| KR | 20180095059 | A | 8/2018 |
| WO | 2015105796 | A1 | 7/2015 |
| WO | 2019138342 | A1 | 7/2019 |

OTHER PUBLICATIONS

International Search Report and Written Opinion—PCT/US2020/070391—ISA/EPO—Nov. 16, 2020.

Sony Corporation: "Sony Releases Stacked CMOS Image Sensor for Smartphones with Industry's Highest*1 48 Effective Megapixels *2", Sony Semiconductor Solutions Corporation, Jul. 23, 2018, pp. 1-6.

International Search Report and Written Opinion—PCT/US2020/070391—ISA/EPO—dated Nov. 16, 2020, 22 pp.

* cited by examiner

FIG. 3A

304C

| | | | | | | | | | | | | | |
|---|---|---|---|---|---|---|---|---|---|---|---|---|---|
| G | B | G | B | G | B | G | B | G | B | G | B | G | B |
| . | . | . | . | . | . | . | . | . | . | . | . | . | G |
| G | B | G | B | G | B | G | B | G | B | G | B | . | B |
| R | G | R | G | R | G | R | G | R | G | R | G | . | G |
| G | B | G | B | G | B | G | B | G | B | G | B | . | B |
| R | G | R | G | R | G | R | G | R | G | R | G | . | G |
| G | B | G | B | G | B | G | B | G | B | G | B | . | B |
| R | G | R | G | R | G | R | G | R | G | R | G | . | G |
| G | B | G | B | G | B | G | B | G | B | G | B | . | B |
| R | G | R | G | R | G | R | G | R | G | R | G | . | G |
| G | B | G | B | G | B | G | B | G | B | G | B | . | B |
| R | G | R | G | R | G | R | G | R | G | R | G | . | G |
| G | B | G | B | G | B | G | B | G | B | G | B | . | B |
| R | G | R | G | R | G | R | G | R | G | R | G | . | G |

304B

| | | | | | | | | | | | | | |
|---|---|---|---|---|---|---|---|---|---|---|---|---|---|
| G | B | G | B | G | B | G | B | G | B | G | B | G | B |
| . | . | . | . | . | . | . | . | . | . | . | . | . | G |
| G | B | G | B | G | B | G | B | G | B | G | B | . | B |
| R | G | R | G | R | G | R | G | R | G | R | G | . | G |
| G | B | G | B | G | B | G | B | G | B | G | B | . | B |
| R | G | R | G | R | G | R | G | R | G | R | G | . | G |
| G | B | G | B | G | B | G | B | G | B | G | B | . | B |
| R | G | R | G | R | G | R | G | R | G | R | G | . | G |
| G | B | G | B | G | B | G | B | G | B | G | B | . | B |
| R | G | R | G | R | G | R | G | R | G | R | G | . | G |
| G | B | G | B | G | B | G | B | G | B | G | B | . | B |
| R | G | R | G | R | G | R | G | R | G | R | G | . | G |
| G | B | G | B | G | B | G | B | G | B | G | B | . | B |
| R | G | R | G | R | G | R | G | R | G | R | G | . | G |

FIG. 3B

IMAGE CAPTURE MODE ADAPTATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims priority to U.S. Provisional Patent Application No. 62/897,697, filed Sep. 9, 2019, which is hereby incorporated by reference in its entirety.

TECHNICAL FIELD

The disclosure relates to image capture and processing.

BACKGROUND

Image capture devices are commonly incorporated into a wide variety of devices. In this disclosure, an image capture device refers to any device that can capture one or more digital images, including devices that can capture still images and devices that can capture sequences of images to record video. By way of example, image capture devices may comprise stand-alone digital cameras or digital video camcorders, camera-equipped wireless communication device handsets, such as mobile telephones having one or more cameras, cellular or satellite radio telephones, camera-equipped personal digital assistants (PDAs), panels or tablets, gaming devices, computer devices that include cameras, such as so-called "web-cams," or any devices with digital imaging or video capabilities.

Certain digital cameras feature the ability to capture specified portions of a potential field-of-view (FOV) for cameras, such as with zoom-in, zoom-out, panoramic, telescope, telephoto, or periscope features. Such features allow a digital camera, using an image sensor and camera processor, to enhance, or otherwise alter, the capture of a scene (or sequence of images, in the case of a video) depending on user settings and/or manipulations (e.g., pinch-to-zoom, flash settings, aspect ratio settings, etc.). In some examples, the potential FOV refers to the entirety of pixels that a particular image sensor can use to sense a scene or image sequence.

In addition, certain image capture devices may include multiple image sensors and/or multiple lenses that may be used in conjunction with one another, or otherwise, may be toggled from one camera to another camera. Example lens types include wide-angle lenses, ultra-wide-angle lenses, telephoto lenses, telescope lenses, periscope-style zoom lenses, fisheye lenses, macro lenses, prime lenses, or various combinations thereof. For example, a dual camera configuration may include both a wide lens and a telephoto lens. Similarly, a triple camera configuration may include an ultra-wide lens, in addition to a wide lens and a telephoto lens. By using multiple lenses and/or image sensors, image capture devices are able to capture images with different FOVs and/or optical zoom levels. Image sensors can then output a number of pixels and pixel values to a camera processor for further processing.

SUMMARY

In general, this disclosure describes image capture techniques involving digital cameras having image sensors, lenses having respective optical zooms, and camera processors. The camera processors may be configured to cause the image sensors to capture image data, such as frames of video data and/or still image shots, using various image capture modes. For example, a camera processor may cause an image sensor to capture one or more frames of image data using pixel binning. An image sensor performs pixel binning by combining multiple pixels of an image sensor into fewer pixels for output to a camera processor (e.g., 4×4 binning, 3×3 binning, 2×2 binning, horizontal binning, vertical binning, etc.).

The image sensor may output combined pixels to the camera processor for further processing. Based on a desired zoom level or zoom ratio, a camera processor may perform digital zoom techniques, such as digital cropping, upsampling, downsampling, scaling, or combinations thereof. As the zoom level increases, however, so does the amount of upsampling or scaling performed by the camera processor. As such, the resulting image data from the increasing zoom levels tends to provide a distorted image or video because of the amount of upsampling or scaling performed to achieve the desired digital zoom level.

In some examples, as the user-requested digital zoom level exceeds a camera transition threshold, the camera processor may be configured to transition between cameras having different optical zoom levels and/or different effective focal lengths. Before the transition between cameras, however, the camera processor may continue to increase the amount of upsampling or scaling used to achieve the desired digital zoom level. In some instances, transitions between cameras may not occur until a large amount of zoom increase has transpired (e.g., from 1.0× zoom to 5.0× zoom, or more).

In an attempt to bridge between such wide gaps, certain cameras may use image sensors with higher and higher pixel counts (e.g., 48MP, 64MP, 108MP), so as to provide as many output pixels as possible for the camera processor to perform digital zoom operations. Because pixel binning is then used with such large image sensors, a camera processor will still have less pixels to use in order to achieve a desired digital zoom level at a desired digital resolution. As such, the camera processor will, nevertheless, use upsampling or scaling to bridge the gap between camera transitions and the amount of image distortion caused by the upsampling or scaling will continue to worsen until a camera transition occurs. Thus, with wide gaps between camera transitions, the amount of image distortion caused by sampling or scaling can seriously degrade image or video quality and as such, the user experience will suffer as the user attempts to perform zoom operations that reach the outer limits of each camera.

Moreover, at the moment when the camera transition occurs, the image or video quality will abruptly change due to the sudden decrease in the amount of upsampling or scaling performed by the camera processor in view of the different optical zoom level of the second camera. This abrupt change is undesirable as it provides inconsistent image or video quality as the digital zoom level increases and transitions between cameras occur.

In accordance with various techniques of this disclosure, the camera processor may cause the image sensor to change binning levels as the camera processor detects changes in the desired zoom level as those zoom levels satisfy predefined binning transition thresholds or camera transition thresholds. As such, the image sensor may utilize different binning levels to capture frames of image data, whether that be video data, still photos, or combinations thereof, in response to the desired digital zoom level increasing or decreasing. In some examples, the desired zoom level may be specified by a user or may be the result of an automatic zoom operation. A camera processor may then receive the image data from the image sensor in the form of pixel information binned or not binned in accordance with the various binning level transitions.

In some instances, depending on the difference between transitioning binning levels, the image sensor may determine a reduced amount of output pixels that were binned at the transitioned binning level prior to outputting those pixels to the camera processor. For example, the image sensor may determine a center portion of the pixels binned using a second, lower level of pixel binning and output the center portion of pixels to the camera processor, rather than the full amount of pixels binned at the second level. In some examples, this may be done in order to maintain a constant or near constant throughput or bit rate to the camera processor between binning transitions. The camera processor may then perform additional digital zoom operations to achieve the desired zoom level using the received output pixels.

In accordance with techniques of this disclosure, a camera processor may receive consistent image quality as a user increases a desired zoom level. In addition, the camera processor may use less upsampling and scaling to achieve the desired zoom level at a desired output resolution. The techniques of this disclosure further provide extended zoom ranges for the camera processor due to timely binning transitions for the image sensor to transition between binning levels, a decrease in the amount of upsampling camera processor performs to achieve the desired zoom level between transitions, etc.

In one example, the techniques of the disclosure are directed to an apparatus configured to capture image data, the apparatus comprising: a memory configured to store image data, and one or more processors in communication with the memory, the one or more processors configured to: cause a first image sensor to capture one or more frames of image data using a first image capture mode in the case that a digital zoom level is less than a first predefined threshold, wherein the first image capture mode includes a first binning level that uses two or more pixels of the first image sensor for each output pixel of the image data, determine that a requested digital zoom level is greater than the first predefined threshold, and cause the first image sensor to capture one or more frames of the image data using a second image capture mode, wherein the second image capture mode includes a second binning level that uses fewer pixels of the first image sensor relative to the first binning level for each output pixel of the image data.

In another example, the techniques of the disclosure are directed to a method of capturing image data, the method comprising: causing a first image sensor to capture one or more frames of image data using a first image capture mode in the case that a digital zoom level is less than a first predefined threshold, wherein the first image capture mode includes a first binning level that uses two or more pixels of the first image sensor for each output pixel of the image data, determining that a requested digital zoom level satisfies the first predefined threshold, and causing the first image sensor to capture one or more frames of the image data using a second image capture mode, wherein the second image capture mode includes a second binning level that uses fewer pixels of the first image sensor relative to the first binning level for each output pixel of the image data.

In another example, the techniques of the disclosure are directed to an apparatus configured to capture image data, the apparatus comprising: means for causing an image sensor to capture a first one or more frames of image data using a first image capture mode in the case that a digital zoom level is less than a first predefined threshold, wherein the first image capture mode includes a first binning level that uses two or more pixels of the image sensor for each output pixel of the image data, means for determining that a requested digital zoom level satisfies the first predefined threshold, and means for causing the image sensor to capture a second one or more frames of the image data using a second image capture mode, wherein the second image capture mode includes a second binning level that uses fewer pixels of the image sensor relative to the first binning level for each output pixel of the image data.

In another example, the techniques of the disclosure are directed to a non-transitory computer-readable storage medium having stored thereon instructions that, when executed, cause one or more processors to: cause a first image sensor to capture one or more frames of image data using a first image capture mode in the case that a digital zoom level is less than a first predefined threshold, wherein the first image capture mode includes a first binning level that uses two or more pixels of the first image sensor for each output pixel of the image data, determine that a requested digital zoom level satisfies the first predefined threshold, and cause the first image sensor to capture one or more frames of the image data using a second image capture mode, wherein the second image capture mode includes a second binning level that uses fewer pixels of the first image sensor relative to the first binning level for each output pixel of the image data.

The details of one or more examples are set forth in the accompanying drawings and the description below. Other features, objects, and advantages will be apparent from the description, drawings, and claims.

BRIEF DESCRIPTION OF DRAWINGS

FIGS. 3A and 3B are diagrams illustrating how the image sensor of FIG. 1 may perform various binning operations in accordance with various aspects of the techniques described in this disclosure.

DETAILED DESCRIPTION

Figure 1:
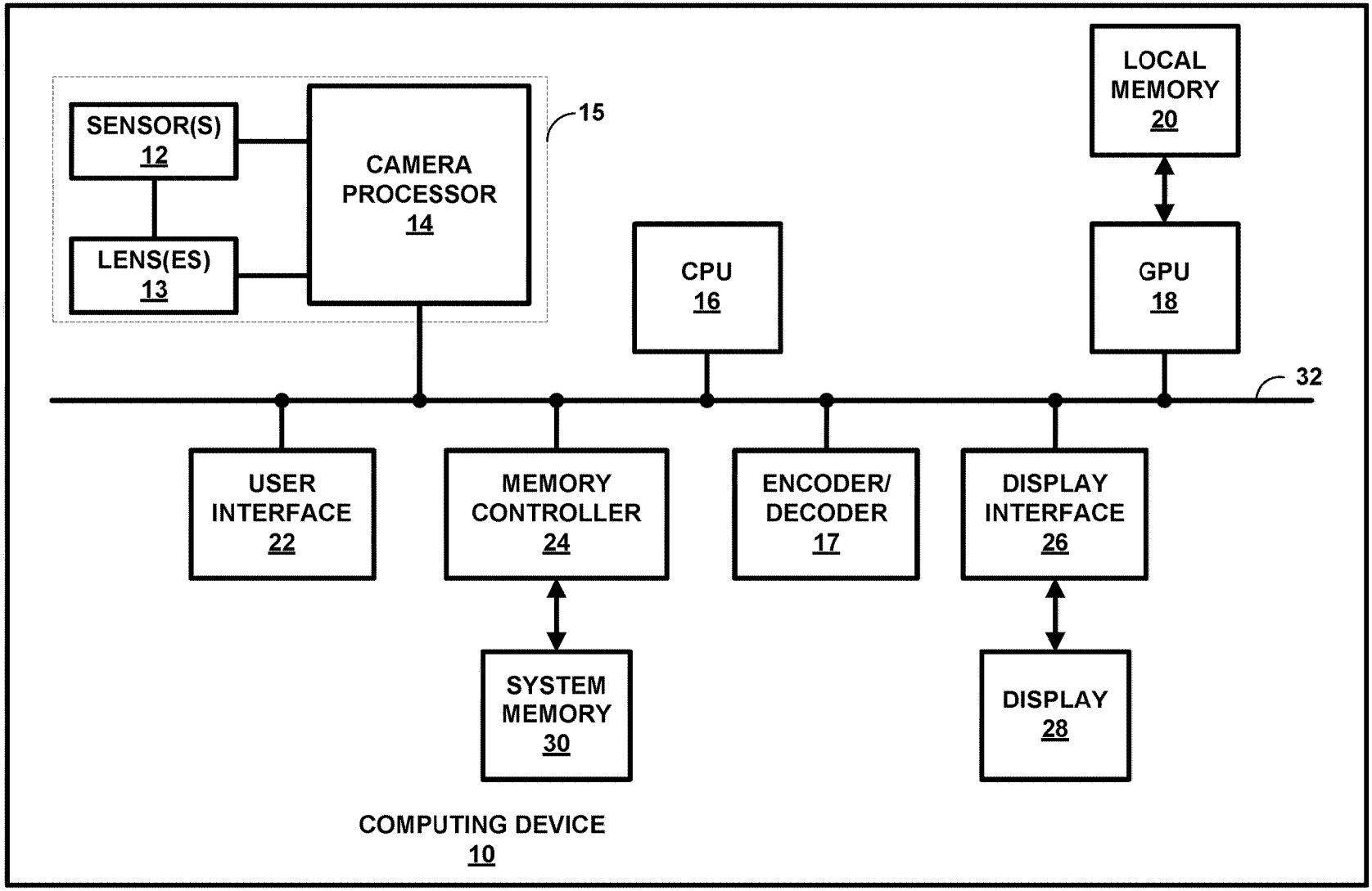
FIG. 1 is a block diagram of a device configured to perform one or more of the example techniques described in this disclosure.

An image sensor may use various capture modes under various circumstances to capture frames of image data, such as video data or snapshots, using various binning levels. For example, certain camera processors can cause image sensors to use various binning techniques to capture image data by combining multiple pixels of an image sensor into a fewer number of pixels. The image sensor may then output the combined pixels to the camera processor. Binning techniques can be particularly advantageous in cases where a camera processor interfaces with high-resolution or ultra-high resolution image sensors (e.g., 12-megapixels (MP), 48MP, 64MP, 108MP, 120MP, 144MP, etc.). For example, the pixels on such image sensors can have small physical sizes. In such examples the incident light on each pixel can be so limited, especially in low-light conditions, and as such, each individual pixel can become increasingly susceptible to noise.

As such, binning techniques improve the signal-to-noise ratio (SNR) by combining pixels together through various combination schemes, including averaging or summing multiple pixels together for each output pixel. In addition, binning techniques can provide higher frame rates for digital cameras, for example, in the case of recording video or providing image previews to a user via a display device. In addition, binning techniques can reduce the processing burden and demands placed on the camera processor, thereby reducing the amount of processing performed on the image data received from an image sensor, and also, increasing efficiency of the system overall. Furthermore, when an image sensor uses binning techniques at certain zoom levels, the human eye may not be able to perceive that the image sensor is using pixel binning, much less whether the image sensor is using 4×4 binning, 2×2 binning, or non-binning, etc. That is, the human eye may not perceive degradation due to binning until the zoom level increases to certain high zoom levels. While binning techniques may come at the cost of spatial resolution, the output resolution can still be high due to the pixel density of certain image sensors.

The image sensor may then output the combined pixels to a camera processor. Using the output pixels from the image sensor, the camera processor may perform digital zoom techniques to achieve a desired digital zoom level at a desired output resolution (e.g., 1080p, 4K, 8K, etc.). In order to do so, the camera processor may perform any number of digital zoom techniques, including downsampling, cropping, upsampling, scaling, or combinations thereof. In some examples, the camera processor may first crop the pixels received from the image sensor to remove those pixels that fall outside of a field of zoom before then upsampling or downsampling the remaining pixels. Upsampling or scaling, however, tends to degrade the resulting image quality as the zoom level increases. This is because upsampling or scaling involves the process of using known pixel values received from the image sensor and interpolating between those pixel values in order to artificially create new pixel values until the desired output resolution is achieved. Performing large amounts of upsampling can, thus, distort the resulting image or video. The image quality may continue to degrade and become distorted as the amount of upsampling increases.

In addition, the camera processor may switch between multiple cameras having different effective focal lengths. For example, a camera processor may switch between cameras in response to detecting a camera transition trigger, such as a particular zoom level satisfying a camera transition threshold. In some examples, however, the amount of increasing zoom levels may be quite high before a particular camera transition threshold is met. For example, a first camera may be used for digital zoom levels between 1.0× and 5.0× zoom, with a second camera being used for zoom levels greater than 5.0× zoom. Thus, in order to bridge the gap between various cameras, larger and larger image sensors may be used in an effort to provide the camera processor with as many pixels as possible until the next camera transition occurs.

In such instances, the image quality will continue to degrade due to the camera processor using digital upsampling or digital scaling techniques until the camera processor switches to the next camera, which may not occur until a high enough zoom level has been reached. At that time, the camera processor may perform less upsampling due to the difference in effective focal length of the transitioned camera. Thus, switching between cameras also provides a user with inconsistent image quality. For example, as the camera processor uses upsampling or scaling, the image quality will continue to degrade until the desired zoom level reaches the camera transition threshold, at which point the image quality will suddenly improve and then start to degrade again once the camera processor starts upsampling again with the new camera. These distortions and inconsistencies in image quality can be particularly noticeable when using digital zoom while recording high resolution video at high frame rates that may switch between multiple cameras as the user attempts to zoom in and out of a scene while recording video.

The aforementioned problems, among others, may be addressed by the disclosed capture mode adaptation techniques by providing cameras capable of leveraging various pixel binning levels at various zoom levels. Specifically, depending on the binning technique used, a camera processor may determine a binning transition threshold at which to cause the image sensor to alter the pixel binning level at the image sensor. In one example, the camera processor may cause the image sensor to transition from one binning level (e.g., 2×2, 3×3, 4×4, 8×8, etc.) to a second binning level that provides less binning than the first binning level (e.g., non-binning). It should be noted that "non-binning" or "no binning" generally involves an image sensor using one pixel of the image sensor, rather than using multiple pixels, for each output pixel of the image data that is to be output to a camera processor. In other words, non-binning may mean that there is a 1-to-1 correspondence between input pixels and output pixels.

In some examples, an image sensor may transition from one binning level to a lower binning level once a predefined binning transition threshold is met (e.g., a particular zoom level). Advantageously, the human eye may not perceive a difference between images captured using binning techniques or not at low zoom levels, such as zoom levels below the binning transition threshold amount. This allows the image capture device to utilize binning at certain lower zoom levels without impacting the user experience. That is, the image sensor may start with a binning level and then transition to a lower binning level as the zoom level increases in order to decrease the amount of upsampling used and to preserve the user experience as much as possible. In addition, camera transitions, coupled with such binning transitions, may allow a user to span the entire zoom spectrum smoothly without readily noticing when the camera transition occurs. Due to the change between binning levels that occurs prior to a particular camera transition, the camera processor may decrease the amount of upsampling or scaling used near the camera transition threshold compared to if a uniform binning level were used for the same zoom span.

As is described in detail below, the camera processor may cause such a transition in response to a particular zoom level satisfying a predefined binning transition threshold or in some cases, as the zoom level approaches the predefined binning transition threshold. The image sensor may then output combined pixels, non-binned pixels, portions of binned or non-binned pixels, to the camera processor, where then the camera processor may perform digital zoom using the pixels received from the image sensor.

FIG. 1 is a block diagram of a device configured to perform one or more of the example techniques described in this disclosure. Examples of computing device 10 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), an Internet telephone, a digital camera, a digital video recorder, a handheld device, such as a portable video game device or a personal digital assistant (PDA), a drone device, or any device that may include one or more cameras.

As illustrated in the example of FIG. 1, computing device 10 includes one or more image sensor(s) 12. Image sensor(s) 12 may be referred to in some instances herein simply as "sensor 12," while in other instances may be referred to as a plurality of "sensors 12" where appropriate. Computing device 10 further includes one or more lens(es) 13 and a camera processor 14. As shown in FIG. 1, a camera 15 may refer to a collective device including one or more image sensor(s) 12, one or more lens(es) 13, and at least one camera processor 14. In any event, multiple cameras 15 may be included with a single computing device 10 (e.g., a mobile phone having one or more front facing cameras and one or more rear facing cameras). In a non-limiting example, one computing device 10 may include a first camera 15 comprising a 16MP image sensor 12, a second camera 15 comprising a 108MP image sensor 12, a third camera 15 having a 12MP image sensor 12, etc., and dual "front-facing" cameras, etc. It should be noted that while some example techniques herein may be discussed in reference to so-called "rear" cameras or multiple rear-facing cameras, the techniques of this disclosure are not so limited, and a person of skill in the art will appreciate that the techniques of this disclosure may be implemented for any type of cameras 15 and for any transitions between cameras 15 that are included with computing device 10.

In some instances, camera 15 may include multiple camera processors 14. In some instances, multiple camera processors 14 may refer to an image signal processor (ISP) that uses various processing algorithms under various circumstances. In some examples, camera processor 14 may include an image front end (IFE) and/or an image processing engine (IPE) as part of a processing pipeline. In addition, camera 15 may include a single one of sensor(s) 12 or a single one of lens(es) 13.

As illustrated, computing device 10 may further include a central processing unit (CPU) 16, an encoder/decoder 17, a graphics processing unit (GPU) 18, local memory 20 of GPU 18, user interface 22, memory controller 24 that provides access to system memory 30, and display interface 26 that outputs signals that cause graphical data to be displayed on display 28.

While some example techniques are described herein with respect to a single sensor 12, the example techniques are not so limited, and may be applicable to various camera types used for capturing images/videos, including devices that include multiple image sensors, multiple lens types, and/or multiple camera processors. For example, computing device 10 may include dual lens devices, triple lens devices, etc. As such, each lens 13 and image sensor 12 combination may provide various optical zoom levels, angles of view (AOV), focal lengths, FOVs, etc. In some examples, one image sensor 12 may be allocated for each lens 13. That is, multiple image sensors 12 may be each allocated to different lens types (e.g., wide lens, ultra-wide lens, telephoto lens, and/or periscope lens, etc.). For example, a wide lens may correspond to a first image sensor 12 of a first size (e.g., 108MP), whereas an ultra-wide lens may correspond to a second image sensor 12 of a different size (e.g., 16MP). In another example, a telephoto lens may correspond to an image sensor 12 of a third size (e.g., 12MP). In an illustrative example, a single computing device 10 may include two or more cameras 15, where at least two of the cameras 15 correspond to image sensors 12 having a same size (e.g., two 12MP sensors, three 108MP sensors, three 12MP sensors, two 12MP sensors and a 108MP sensor, etc.). In any event, image sensors 12 may correspond to different lenses 13 so as to provide multiple cameras 15 for computing device 10.

In some examples, a single image sensor 12 may correspond to multiple lenses 13. In such examples, light guides may be used to direct incident light on lenses 13 to respective image sensor(s) 12. An example light guide may include a prism, a moving prism, mirrors, etc. In this way, light received from a single lens may be redirected to a particular sensor 12, such as away from one sensor 12 and toward another sensor 12. For example, camera processor 14 may cause a prism to move and redirect light incident on one of lenses 13 in order to effectively change the focal lengths for the received light. In any event, computing device 10 may include multiple lenses 13 corresponding to a single image sensor 12. In addition, computing device 10 may include multiple lenses 13 corresponding to separate image sensors 12. In such instances, separate image sensors 12 may be of different sizes (e.g., a 12MP sensor and a 108MP sensor) or in some examples, at least two of the separate image sensors 12 may be of the same size (e.g., two 12MP sensors, three 108MP sensors, three 12MP sensors, two 12MP sensors and a 108MP sensor, etc.).

In some examples, a single camera processor 14 may be allocated to one or more sensors 12. In some instances, however, multiple camera processors 14 may be allocated to one or more sensors 12. For example, camera processor 14 may use multiple processing algorithms under various circumstances to perform digital zoom operations or other processing operations. In examples including multiple camera processors 14, camera processors 14 may share sensors 12, where each camera processor 14 may interface with each sensor 12 regardless of any processor-to-image sensor allocation rules. For example, each camera processor 14 may coordinate with one another to efficiently allocate processing resources to the sensor(s) 12.

In addition, while camera 15 may be described as comprising one sensor 12 and one camera processor 14, camera 15 may include multiple sensors and/or multiple camera processors. In any event, computing device 10 may include multiple cameras 15 that may include one or more sensor(s) 12, one or more lens(es) 13, and/or one or more camera processor(s) 14. In some examples, camera 15 may refer to sensor(s) 12 as the camera device, such that camera 15 is a sensor 12 coupled to camera processor 14 (e.g., via a communication link) and/or lens(es) 13, for example.

Also, although the various components are illustrated as separate components, in some examples the components may be combined to form a system on chip (SoC). As an example, camera processor 14, CPU 16, GPU 18, and display interface 26 may be formed on a common integrated circuit (IC) chip. In some examples, one or more of camera processor 14, CPU 16, GPU 18, and display interface 26 may be in separate IC chips. Various other permutations and combinations are possible, and the techniques of this disclosure should not be considered limited to the example illustrated in FIG. 1.

The various components illustrated in FIG. 1 (whether formed on one device or different devices), including sensor 12 and camera processor 14, may be formed as at least one of fixed-function or programmable circuitry, or a combination of both, such as in one or more microprocessors, application specific integrated circuits (ASICs), field programmable gate arrays (FPGAs), digital signal processors (DSPs), or other equivalent integrated or discrete logic circuitry. Examples of local memory 20 include one or more volatile or non-volatile memories or storage devices, such as random-access memory (RAM), static RAM (SRAM), dynamic RAM (DRAM), erasable programmable ROM (EPROM), electrically erasable programmable ROM (EEPROM), flash memory, a magnetic data media or an optical storage media.

The various structures illustrated in FIG. 1 may be configured to communicate with each other using bus 32. Bus 32 may be any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 1 is merely exemplary, and other configurations of computing devices and/or other image processing systems with the same or different components may be used to implement the techniques of this disclosure.

Camera processor 14 is configured to receive image frames (e.g., pixel data) from sensor 12, and process the image frames to generate image and/or video content. For example, image sensor 12 may be configured to capture individual frames, frame bursts, frame sequences for generating video content, photo stills captured while recording video, image previews, or motion photos from before and/or after capture of a still photograph. CPU 16, GPU 18, camera processors 14, or some other circuitry may be configured to process the image and/or video content captured by sensor 12 into images or video for display on display 28. In an illustrative example, CPU 16 may cause image sensor 12 to capture image frames using pixel binning and/or may receive pixel data from image sensor 12. In the context of this disclosure, image frames may generally refer to frames of data for a still image or frames of video data or combinations thereof, such as with motion photos. Camera processor 14 may receive pixel data of the image frames in any format. For example, the pixel data may include different color formats, such as RGB, YCbCr, YUV, and the like.

In some examples, camera processor 14 may comprise an image signal processor (ISP). For instance, camera processor 14 may include a camera interface that interfaces between sensor 12 and camera processor 14. Camera processor 14 may include additional circuitry to process the image content. Camera processor 14 may be configured to perform various operations on image data captured by sensor 12, including auto white balance, color correction, or other post-processing operations.

In addition, camera processor 14 may be configured to analyze pixel data and/or output the resulting images (e.g., pixel values for each of the image pixels) to system memory 30 via memory controller 24. Each of the images may be further processed for generating a final image for display. For example, GPU 18 or some other processing unit, including camera processor 14 itself, may perform color correction, white balance, blending, compositing, rotation, or other operations to generate the final image content for display.

In addition, computing device 10 may include a video encoder and/or video decoder 17, either of which may be integrated as part of a combined video encoder/decoder (CODEC). Encoder/decoder 17 may include a video coder that encodes video captured by one or more camera(s) 15 or a decoder that can decode compressed or encoded video data. In some instances, CPU 16 may be configured to encode and/or decode video data, in which case, CPU 16 may include encoder/decoder 17.

CPU 16 may comprise a general-purpose or a special-purpose processor that controls operation of computing device 10. A user may provide input to computing device 10 to cause CPU 16 to execute one or more software applications. The software applications that execute on CPU 16 may include, for example, a camera application, a graphics editing application, a media player application, a video game application, a graphical user interface application or another program. For example, a camera application may allow the user to control various settings of camera 15. The user may provide input to computing device 10 via one or more input devices (not shown) such as a keyboard, a mouse, a microphone, a touch pad or another input device that is coupled to computing device 10 via user interface 22. For example, user interface 22 may receive input from the user to adjust desired digital zoom levels, alter aspect ratios of image data, record video, take a snapshot while recording video, apply filters to the image capture, select a region-of-interest for automatic-focus operations, record slow motion video or super slow motion video, apply night shot settings, capture panoramic image data, etc.

One example of the software application is a camera application. CPU 16 executes the camera application, and in response, the camera application causes CPU 16 to generate content that display 28 outputs. For instance, display 28 may output information such as light intensity, whether flash is enabled, and other such information. The user of computing device 10 may interface with display 28 (e.g., via user interface 22) to configure the manner in which the images are generated (e.g., with or without flash, focus settings, exposure settings, and other parameters). The camera application also causes CPU 16 to instruct camera processor 14 to process the images captured by sensor 12 in the user-defined manner. For example, CPU 16 may instruct camera processor 14 to perform a zoom operation on the images captured by sensor 12. In some examples, CPU 16 may receive a request to zoom from a user (e.g., a pinch-to-zoom command, a discrete input, such as operation of a 0.5× zoom button, 2× zoom button, 3× zoom button, 10× zoom button, etc., a slider input, or some combination thereof). In some examples, a zoom operation may include a digital zoom that comprises a zoom field. For instance, a digital zoom field may include a portion of less than the full FOV of sensor 12. CPU 16 may then instruct camera processor 14 to perform the digital zoom operation accordingly. In some examples, camera processor 14 may receive the request to zoom from the user directly (e.g., by detecting certain input from a user, such as during a time when the camera application is active and/or running in the foreground of computing device 10).

In any event, camera processor 14 may cause image sensor 12 to capture frames of image data, such as video data, using various binning levels that combine multiple pixels of the image sensor into fewer output pixels, as is the case with binning, or uses one pixel for each output pixel, as is the case with non-binning. When the camera processor 14 receives a zoom request, camera processor 14 may determine whether the zoom request satisfies a predefined binning transition threshold, at which point camera processor 14 may cause image sensor 12 to capture subsequent frames using an altered binning level. In a non-limiting example, image sensor 12 may initially capture image data using a 2×2 binning level, where four pixels are combined into one output pixel. As such, a 108MP image sensor 12, such as a 108MP image sensor 12 that corresponds to a wide-angle lens, may use four pixels for each output pixel, thereby transferring 27MP binned pixels to camera processor 14. In another example, image sensor 12 may initially capture image data using a 3×3 binning level, where nine pixels are combined into one output pixel. As such, a 108MP image sensor 12 may use nine pixels for each output pixel, thereby transferring 12MP binned pixels to camera processor 14.

Camera processor 14 may receive a desired digital zoom level that exceeds a first predefined threshold. As such, camera processor 14 may cause image sensor 12 to transition from 2×2 binning to non-binning, where now image sensor 12 uses one pixel of image sensor 12 for each output pixel of the image data. As such, image sensor 12 may potentially output 108MP to camera processor 14. In some instances, however, camera processor 14 may additionally cause image sensor 12 to maintain a constant or near constant throughput level. As such, camera processor 14 may cause image sensor 12 to output 25% of the potential 108MP to arrive at a constant or near constant throughput of, in this particular example, 27MP.

In some examples, camera processor 14 may set the various transition parameters (e.g., binning transition threshold, reduced output portion, camera transition threshold, etc.) in order to keep the data throughput or bit rate within a specific range that avoids spikes in the throughput or bit rate. For example, the range in the above scenario could be 27MP±1MP such that the throughput can vary while limiting large fluctuations in throughput data from image sensor 12 to camera processor 14. This technique may be especially advantageous in the context of video, which may be desirable to be captured at high resolution and a high frames-per-second (FPS). If the processor is overburdened, such as with large fluctuations of incoming pixel data, then camera processor 14 will likely be unable to achieve high FPS. In such instances, any captured movement in the video will appear choppy or the movement will appear less smooth. As such, the disclosed technology reduces distortion, and potential choppiness, while zooming and while also keeping throughput high.

In addition, camera processor 14 may further use digital cropping, downsampling, upsampling or scaling to achieve the desired digital zoom level at the desired number of pixels for display (e.g., a desired resolution parameter). In one illustrative example, camera 15 having a 48MP image sensor 12 with one lens 13 may capture a maximum pixel array of roughly 8000×6000 pixels. Camera 15, using the 48MP image sensor 12, may be configured to capture so-called 4K picture or video, where the resolution for such picture or video is approximately 4000×2000 pixels or ~8MP. Thus, in the case of a digital zoom operation, the 48MP image sensor 12 can potentially output 48MP non-binned pixels to camera processor 14, where camera processor 14 can perform digital cropping of the 8000×6000 pixels to achieve the desired digital zoom level before using other techniques, such as downsampling, for instances where the number of pixels remaining after the digital crop is greater than the desired resolution, or upsampling, for instances where the number of pixels remaining after the digital crop is less than the desired resolution.

In an example where image sensor 12 uses 2×2 binning, the 48MP image sensor 12 can potentially output 12MP binned pixels to camera processor 14, where camera processor 14 can perform digital cropping of the 12MP to achieve the desired digital zoom level before using downsampling, upsampling, or scaling techniques to achieve the desired digital zoom level at the desired resolution.

In some examples, the 48MP image sensor 12 can output to camera processor 14 less than all of the available pixels (binned or non-binned), such as a predetermined percentage of the available pixels to be output. That is, camera processor 14 may perform any number of digital zoom techniques based on a reduced portion of a potential FOV of image sensor 12 (e.g., all binned or non-binned pixels of image sensor 12). In one example, the 48MP image sensor 12 can output a reduced portion of the 2×2 binned pixels, or a reduced portion of the non-binned pixels, to camera processor 14. For example, 48MP image sensor 12 may output 25% of non-binned pixels, equaling 12MP non-binned pixels. Camera processor 14 can perform digital cropping of the 12MP non-binned pixels to achieve the desired digital zoom level before using downsampling, upsampling, or scaling techniques to achieve the desired digital zoom level at the desired resolution.

In another example, 48MP image sensor 12 may output a reduced portion of binned pixels to camera processor 14, such as in the case where camera processor 14 is causing image sensor 12 to perform multiple binning transitions. For example, 48MP image sensor 12 may output a predetermined percentage of binned pixels to camera processor 14 pursuant to a binning transition from a first binning level that uses multiple pixels of image sensor 12 for each output pixel of the image data to a second binning level that uses fewer pixels of image sensor 12 relative to the first binning level for each output pixel of the image data, but where the second binning level uses at least two pixels of image sensor 12 for each output pixel of the image data. As such, camera processor 14 can perform digital cropping using the reduced number of binned pixels to achieve the desired digital zoom level before using other digital zoom techniques. A person skilled in the art will understand that a 48MP image sensor 12 is only used herein as an illustrative example and that the techniques of this disclosure may use any number image sensors 12 to perform the techniques of this disclosure.

In some instances, camera processor 14 or CPU 16 may activate various lenses, for example, based on the zoom level. In some examples, camera processor 14 may determine that the desired digital zoom level exceeds a camera transition threshold. Camera processor 14 may then switch from one camera 15 to another camera 15 in order to accommodate the desired digital zoom level. In one such example, camera processor 14 may transition lenses 13 at certain times by switching from one lens to another lens or in another example, camera processor 14 may transition sensors 12 by switching from one sensor 12 to another sensor 12. In one example involving transitioning between various lenses 13, one camera 15 may include a telephoto lens 13 and another camera 15 may include a wide-angle lens 13. As such, during a transition from the wide-angle lens 13 to the telephoto lens 13, camera processor 14 may activate the telephoto lens 13 at a requested digital zoom level (e.g., five times zoom (5×), 10× zoom, 15× zoom, etc.) and deactivate the wide-angle lens 13. The various lenses 13 may have dedicated image sensors 12 for each lens 13 or in some instances, multiple lenses 13 for each image sensor 12. For example, a single sensor 12 may be used with multiple lenses 13, such that a single light ray may pass through multiple lenses 13 prior to arriving at a single sensor 12.

In some examples, a first image sensor 12 corresponding to a first camera may be the same image sensor 12 that corresponds to a second camera. That is, an image sensor 12 that corresponds to a second camera may also be a first image sensor that corresponds to a first camera. In such examples, the first camera and the second camera may nonetheless provide different effective focal lengths, for example, due to different lenses being used, the activation of moving prisms, etc.

Memory controller 24 facilitates the transfer of data going into and out of system memory 30. For example, memory controller 24 may receive memory read and write commands, and service such commands with respect to memory 30 in order to provide memory services for the components in computing device 10. Memory controller 24 is communicatively coupled to system memory 30. Although memory controller 24 is illustrated in the example of computing device 10 of FIG. 1 as being a processing circuit that is separate from both CPU 16 and system memory 30, in other examples, some or all of the functionality of memory controller 24 may be implemented on one or both of CPU 16 and system memory 30.

System memory 30 may store program modules and/or instructions and/or data that are accessible by camera processor 14, CPU 16, and GPU 18. For example, system memory 30 may store user applications (e.g., instructions for the camera application), resulting images from camera processor 14, etc. System memory 30 may additionally store information for use by and/or generated by other components of computing device 10. For example, system memory 30 may act as a device memory for camera processor 14. System memory 30 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some examples, system memory 30 may include instructions that cause camera processor 14, CPU 16, GPU 18, and display interface 26 to perform the functions ascribed to these components in this disclosure. Accordingly, system memory 30 may be a computer-readable storage medium having instructions stored thereon that, when executed, cause one or more processors (e.g., camera processor 14, CPU 16, GPU 18, and display interface 26) to perform various functions.

In some examples, system memory 30 is a non-transitory storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from computing device 10, and moved to another device. As another example, memory, substantially similar to system memory 30, may be inserted into computing device 10. In certain examples, a non-transitory storage medium may store data that can, over time, change (e.g., in RAM).

Camera processor 14, CPU 16, and GPU 18 may store image data, and the like, in respective buffers that are allocated within system memory 30. Display interface 26 may retrieve the data from system memory 30 and configure display 28 to display the image represented by the generated image data. In some examples, display interface 26 may include a digital-to-analog converter (DAC) that is configured to convert the digital values retrieved from system memory 30 into an analog signal consumable by display 28. In other examples, display interface 26 may pass the digital values directly to display 28 for processing.

Display 28 may include a monitor, a television, a projection device, a liquid crystal display (LCD), a plasma display panel, a light emitting diode (LED) array, an organic LED (OLED), a cathode ray tube (CRT) display, electronic paper, a surface-conduction electron-emitted display (SED), a laser television display, a nanocrystal display or another type of display unit. Display 28 may be integrated within computing device 10. For instance, display 28 may be a screen of a mobile telephone handset, a tablet computer, or a laptop. Alternatively, display 28 may be a stand-alone device coupled to computing device 10 via a wired or wireless communications link. For instance, display 28 may be a computer monitor or flat panel display connected to a personal computer via a cable or wireless link.

Sensor 12 is an image sensor that may include processing circuitry, an array of pixel sensors (e.g., pixels) for capturing representations of light, memory, an adjustable lens, and an actuator to adjust the lens. In some instances, computing device 10 may include multiple sensors and as such, sensor 12 may represent one or more sensors (and accompanying lens(es) 13, apertures, flashes, etc.), where one sensor may capture images for one lens 13 and another separate sensor 12 may capture images for another lens 13. Similarly, camera 15 may include multiple camera processors 14.

In some examples, multiple sensors 12 may be used for a single camera 15. For example, a single camera 15 may include a monochrome sensor (e.g., a "clear" pixel sensor) and a color sensor (e.g., a Bayer sensor). In such examples, reference to a monochrome pixel sensor may refer to a pixel sensor having a monochrome filter disposed over the pixel sensor, whereas in some instances, reference to a color pixel sensor may refer to sensor 12 having a color filter, such as a Bayer filter, disposed over sensor 12. As an example, a red filter, a green filter, or a blue filter may be disposed over sensor 12. Various other filter patterns exist, such as red, green, blue, white ("RGBW") filter arrays; cyan, magenta, yellow, white (CMYW) filter arrays; and/or variations thereof, including proprietary or non-proprietary filter patterns. Although this disclosure discusses certain examples in terms of particular filter patterns, other filter patterns may be used in accordance with the techniques of this disclosure.

In some examples, sensors 12 may include a set of two or more different sensors operating in conjunction with one another. For example, sensors 12 may include two different 'color' sensors operating in conjunction with one another. In such examples, each of the different sensors 12 may support different binning types and/or binning levels. In some examples, the different sensors 12 may operate independently of one another. For example, although operating in conjunction with one another, each of the different sensors 12 may operate with respect to a particular range of zoom levels. In any event, within each zoom level range, sensors 12 may transition between various binning levels (e.g., transition from binning to non-binning). For example, camera processor 14 may cause two or more different sensors 12 operating in conjunction with one another to each transition between various binning levels independently in response to predefined binning transition thresholds being satisfied.

In some examples, a first one or more sensors 12 may be allocated to a first lens 13 (e.g., a wide lens camera, ultra-wide lens camera, telephoto lens camera, periscope lens camera, etc.), whereas a second one or more sensors 12 may be allocated to a second lens 13 that is distinct from the first lens 13. For example, a single computing device 10 may include multiple lenses 13, each including one or more respective sensors 12. The multiple lenses 13 may each serve respective functions as provided by various attributes of the cameras (e.g., lens attributes, aperture attributes, angle-of-view attributes, thermal imaging attributes, etc.). As such, a user may leverage the various attributes of each lens 13 to capture one or more images or sequences of images as in a video recording.

In examples including multiple lenses 13, CPU 16 and/or camera processor 14 may activate particular lenses 13, or combinations of lenses 13, in response to receiving user input (e.g., via user interface 22). For example, CPU 16 and/or camera processor 14 may receive user input via user interface 22 that includes user selection of a particular lens 13 (e.g., a fisheye lens camera). In some examples, CPU 16 may automatically determine which lens 13 to activate and either select an initial lens 13 to activate or transition from one lens 13 to another lens 13. For example, CPU 16 and/or camera processor 14 may determine which lens 13 to activate upon detecting an operating condition that satisfies certain lens-selection criteria (e.g., digital zoom level satisfying a predefined camera transition threshold, a change in lighting conditions, input from a user calling for a particular lens 13, etc.). In some examples, multiple cameras may be used in conjunction with one another to capture one synthetic image or stream of synthetic images, such that camera processor 14 or CPU 16 may process one synthetic image or stream of synthetic images based on the image captures from sensor 12.

In operation, camera processor 14 may initiate capture of a video or image of a scene using a plurality of pixel sensors of sensor 12. In some examples, a video may include a sequence of individual frames. As such, a single frame of a video may resemble the image of the example scene shown in FIG. 2A (described below). In some examples, the example scene shown in FIG. 2A may also be a still shot and/or an image capture taken during a video recording. As such, camera processor 14 causes sensor 12 to capture the image using the plurality of pixel sensors. Sensor 12 may then output pixel information to camera processor 14 (e.g., pixel values, luma values, color values, charge values, Analog-to-Digital Units (ADU) values, etc.), the pixel information representing the captured image or sequence of captured images for each sensor 12. In some examples, camera processor 14 may process monochrome images and/or the color images to obtain an enhanced color image of the scene.

Figure 2A:
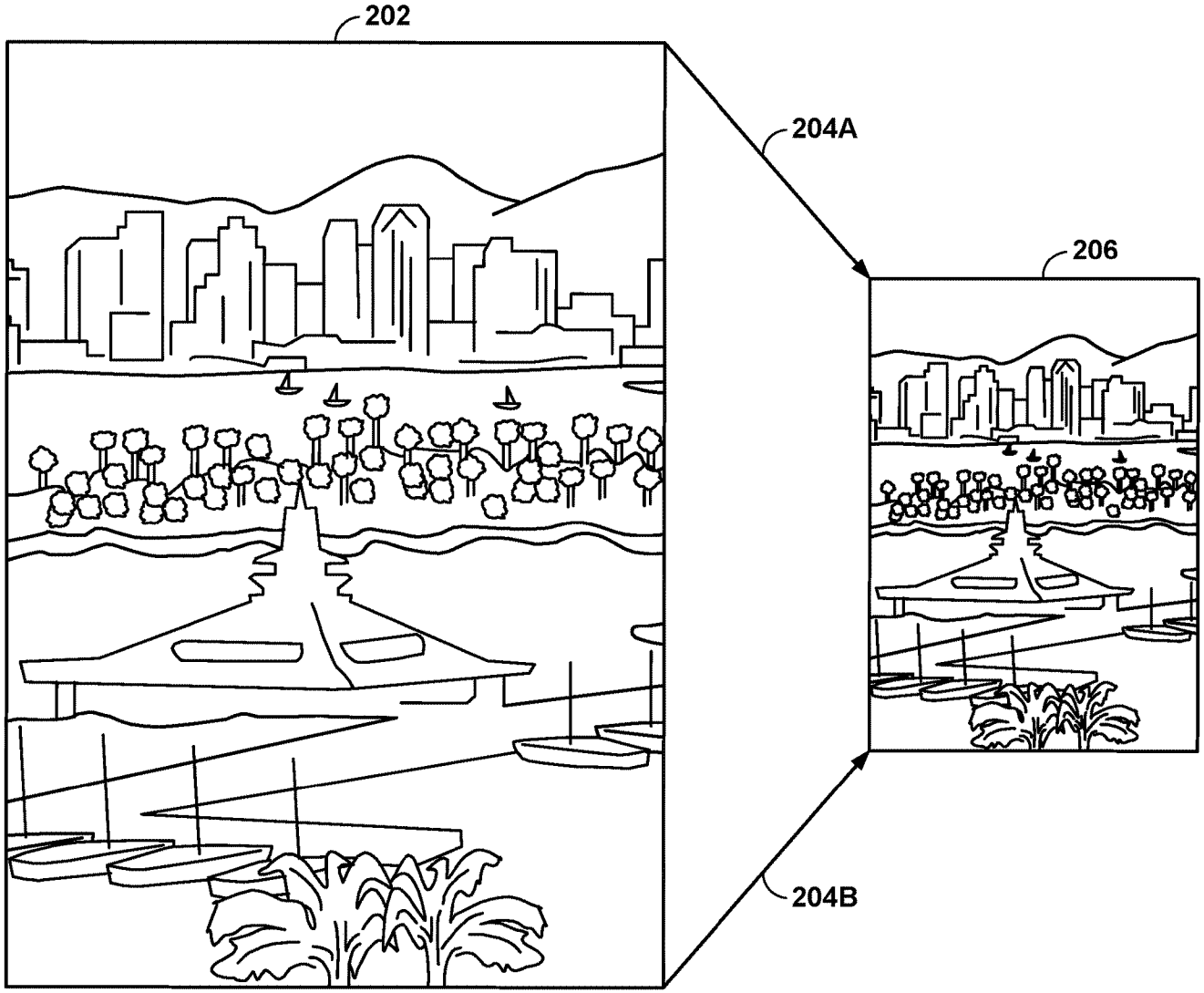
FIG. 2A is an example illustration depicting how the image sensor of FIG. 1 may capture an image using a first binning level that combines pixels in accordance with various aspects of the techniques described in this disclosure.
Figure 2B:
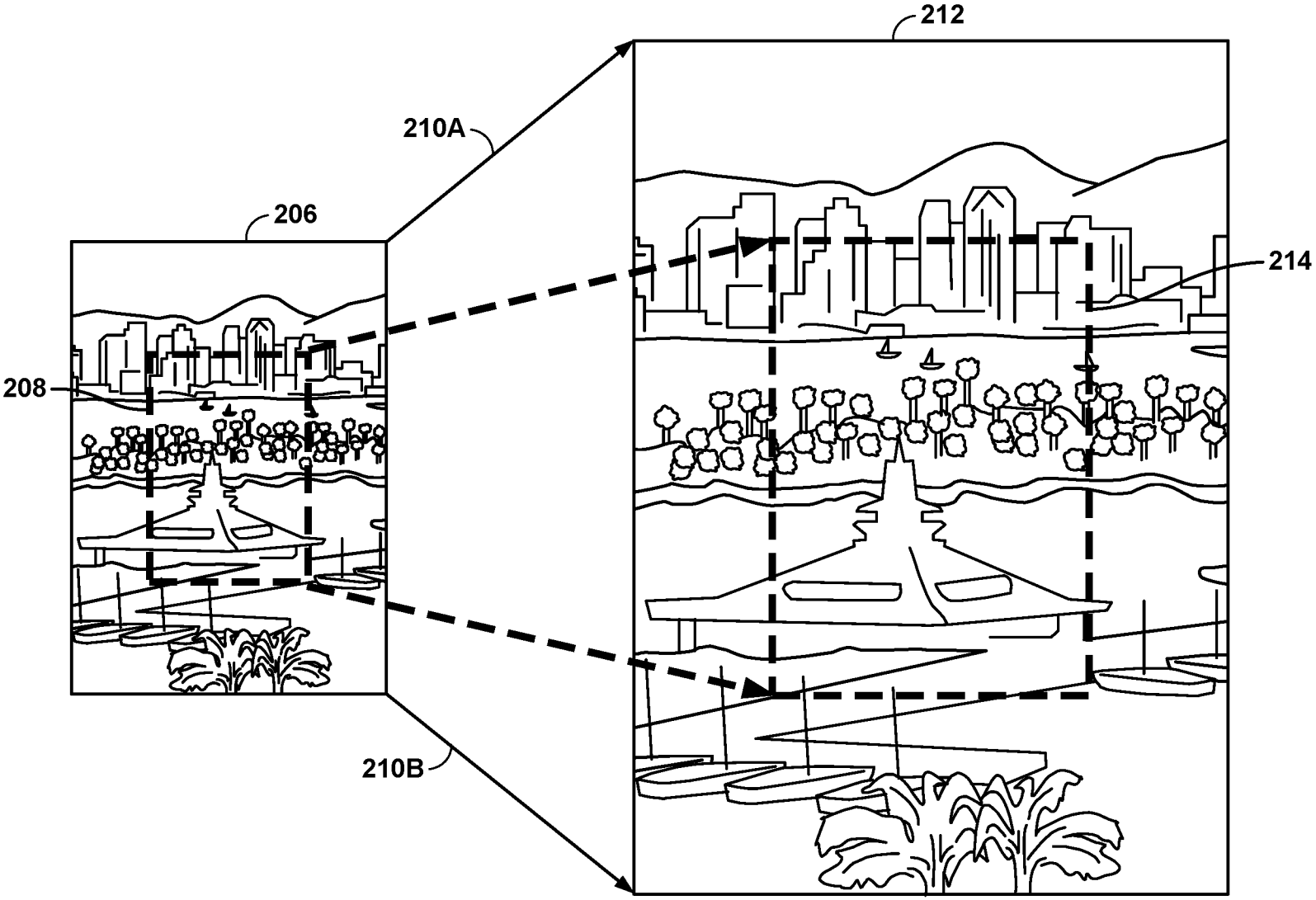
FIG. 2B is an example illustration depicting how the image sensor of FIG. 1 may transition to a second binning level in accordance with various aspects of the techniques described in this disclosure.

FIGS. 2A-2B provide example illustrations depicting how image sensor 12 captures frames of image data using various image capture modes (e.g., binning, partial binning, non-binning, etc.). As will be described, various types of binning modes exist, but in general, image sensor 12 can combine multiple pixels into fewer output pixels, as is the case with binning, or use one pixel for each output pixel, as is the case with non-binning. As an example, image sensor 12 may use a first binning level in the example of FIG. 2A to combine multiple pixels into fewer output pixels (206).

In a non-limiting example, the first binning level may include a 2×2 binning level, in which case, image sensor 12 can combine four pixels of image sensor 12 (202) for each output pixel of the image data (206). In the example of FIG. 2B, however, image sensor 12 may use a second binning level that combines fewer pixels compared to that of the first binning level (212). In a non-limiting example, the second binning level may include no binning, in which case, image sensor 12 uses one pixel for each output pixel of the non-binned image data (212). Image sensor 12 may output the pixels (either combined or not) to camera processor 14 for further processing.

In the example of FIG. 2A, image sensor 12 may capture a scene 202. The capture of scene 202 may initially comprise the total number of pixels of image sensor 12. For example, where image sensor 12 comprises a plurality of pixel sensors, the capture of scene 202 would initially include values for each pixel sensor of image sensor 12. That is, the capture of any scene, video or still capture, would include 100% of the pixel sensors or the full FOV of image sensor 12 as image data (e.g., light) enters image sensor 12.

Camera processor 14 may cause image sensor 12 to capture one or more frames of image data (e.g., video data of scene 202) using a first image capture mode (204A/204B). The first image capture mode may include a binning operation. In some examples, the first image capture mode includes a first binning level that uses two or more pixels of image sensor 12 for each output pixel.

In one example, camera processor 14 may cause image sensor 12 to capture a first one or more frames of scene 202 using a first binning level that combines four pixels of image sensor 12 for each output pixel. For example, image sensor 12 may capture the frames using a 2×2 binning level that combines each neighboring 2×2 pixel into an output pixel. In such examples, image sensor 12 may output 25% fewer pixels than the maximum possible to camera processor 14, as shown by the first binned frame 206 being one-fourth the size of scene capture 202. As a result of the binning process, the output pixels may have a higher SNR at the cost of spatial resolution. Camera processor 14 may also receive a lesser amount of data from sensor 12 with binning, which can be advantageous for sensors having high pixel sensor counts. In this way, the amount of pixel data from image sensor 12 can better match the data throughput of camera processor 14. A person of skill in the art will understand that the type of pixel binning shown in FIGS. 2A and 2B are merely for illustrative purposes and that any number of pixel binning types would work.

In an illustrative example, an image sensor having 108MP may perform 2×2 binning, in which case, each of four neighboring pixels are combined into a single output pixel and transferred to the camera processor as combined pixel values. Thus, instead of receiving 108MP from the image sensor for each frame, the camera processor may receive, and thus, can process, 27MP for each frame as a condensed data stream. In this way, a 108MP sensor may provide a 27MP image when binning, providing a reduced processing burden for the camera processor and/or an improved SNR. An image sensor may use any number of known binning techniques, such as proprietary or non-proprietary pixel binning techniques, where some implementations can achieve different quality results over others. While certain example binning techniques are described herein, the example binning techniques are not so limited, and as such, the image sensor may employ various binning techniques depending on specific pixel sensor patterns and/or other advancements in binning technology.

In some examples, camera processor 14 may perform digital zoom techniques using the binned pixel data 206. Depending on the desired resolution of the image data, camera processor 14 may use cropping, upsampling, downsampling, scaling, or combinations thereof. For example, camera processor 14 may crop the binned pixel data 206 to achieve the desired digital zoom level and then may upsample or downsample depending on the number of cropped pixels as it compares to the desired resolution. For example, if the number of cropped pixels is less than the desired resolution, camera processor 14 may upsample to interpolate between the cropped pixels 206 to mathematically insert pixels between and inflate the number of pixels until the desired resolution is achieved.

As mentioned, upsampling is undesirable in most instances, such as when recording high resolution video or for example, when quickly panning a camera across a scene. This is because upsampling may not accurately capture the detail for each frame of the video or image, as upsampling attempts to make educated guesses in an effort to inflate the number of pixels for high resolution display.

FIG. 2B illustrates image sensor 12 performing a zoom operation, in which the zoom level satisfies a predefined binning transition threshold. As such, camera processor 14 may cause image sensor 12 to transition from the first binning level to a second binning level in response to the zoom operation. In this example, camera processor 14 has received a desired digital zoom level that comprises a portion of scene 206 represented by zoom field 208.

Zoom field 208 is illustrated visually as a dashed box that can be bigger or smaller depending on the zoom level. In some examples, zoom field 208 is of the same geometry as image sensor 12 (e.g., rectangular). However, zoom field 208 may be of a different geometry compared to that of image sensor 12. For example, zoom field 208 may be a square, circle, or some other shape that can enclose a subset of pixel sensors. In some examples, zoom field 208 may be specified by a user via user interface 22 or may be the result of an automatic zoom operation.

In addition, the zoom field 208 may include any portion of image sensor 12. For example, camera processor 14 may receive instructions to zoom-in on an upper portion of an image. In one example, a user may use a pinch-to-zoom operation at an upper area of display 28, for example, during an image preview prior to taking a picture, during a video capture, etc. In such examples, the zoom field 208 may include an upper portion of pixels of image sensor 12 that corresponds to the pinch-to-zoom at the upper area of display 28. As such, image sensor 12 may output a reduced portion of binned or non-binned pixels to camera processor 14, where the reduced portion corresponds to the upper area. In some examples, image sensor 12 may output a reduced portion of binned or non-binned pixels to camera processor 14, where the camera processor 14 may perform digital zoom operations to achieve the desired digital zoom level at the desired resolution (e.g., 1080p, etc.). While an upper area of display 28 is used here as an example, the techniques of this disclosure are not so limited, and a person skilled in the art will understand that other regions-of-interest may be used for such zoom operations.

In addition, camera processor 14 may perform a digital zoom operation on the binned pixels of frame 206. In the example of FIG. 2B, camera processor 14 has received a desired digital zoom level of 2× zoom from a user. In this example, camera processor 14 has predefined a 2× zoom level as the binning transition threshold at which to cause a transition from a first binning level to a second binning level (210A/210B). Arrows 210A/210B illustrate the difference in size of the image data captured using the first binning level compared to that of the image data captured using the second binning level. In some examples, the image data may be frames of video data.

In some examples, the zoom level may be set by a user, for example, by performing a pinch-to-zoom operation, using a sliding zoom bar, or some other input configured to cause a zoom operation, such as a visual or audible gesture (e.g., voice command or visual cue), remote signal, or a manipulation of the camera (e.g., twisting a lens piece). In some examples, a zoom level may be set to automatically change in response to a user setting, such as based on a timer setting or programmed routine.

In the example of FIG. 2B, camera processor 14 may receive an indication that a current camera 15 is to perform a zoom operation that satisfies a predefined binning transition threshold. For example, camera processor 14 may determine that the desired digital zoom level satisfies the predefined binning transition threshold when the digital zoom level is greater than or equal to the predefined binning transition threshold. In one example, zoom field 208 may correspond to a zoom request that includes zoom level relative to the optical zoom of a lens currently in use. In some examples, as a user increases the zoom, zoom field 208 gets smaller until it satisfies the predefined binning transition threshold. The example of FIG. 2B illustrates the zoom field 208 reaching a zoom level that satisfies the binning transition threshold.

In accordance with techniques of this disclosure, camera processor 14 may cause image sensor 12 to transition from the first image capture mode (e.g., 2×2 pixel binning or other binning mode) to a second image capture mode (210A/210B). For example, camera processor 14 may cause image sensor 12 to capture a second one or more frames of the image data using the second image capture mode, wherein the second image capture mode includes a second binning level that uses fewer pixels of the image sensor relative to the first binning level for each output pixel of the image data.

In one example, the second binning level may be a non-binning level. In such examples where image sensor 12 transitions from a first binning level to another binning level, camera processor 14 may determine a difference in the number of output pixels that would result from the transition from the first binning level to the next binning level.

Camera processor 14 may then determine a pixel reduction amount based on the difference between the two binning levels. For example, the reduction amount may be set such that the number of output pixels from the first binning level approximates the number of output pixels from the second binning level. In a non-limiting example image sensor 12 may be a 48MP image sensor switching from 2×2 binning to non-binning, the camera processor may determine the reduction amount to be 25% of the unbinned output pixels, as this would achieve a data throughput of 12MP before and after the binning level transition. Camera processor 14 may then cause image sensor 12 to output the reduced pixel amount following the binning transition.

In some examples, camera processor 14 may use the reduced portion of output pixels to achieve the desired digital zoom level following the binning level transition using various digital zoom techniques. For example, camera processor 14 may use cropping and downsampling to achieve a first desired digital zoom level, cropping to achieve a second desired digital zoom level greater than the first, and cropping and upsampling to achieve a third desired digital zoom level greater than the second. That is, camera processor 14 may determine that the desired digital zoom level satisfies various digital zoom thresholds, such as an upsampling threshold where the camera processor 14 is to perform upsampling techniques to achieve the desired digital zoom level at the desired resolution. In some examples, the upsampling threshold corresponds to a threshold number of pixels that camera processor 14 is able to crop in order to achieve the desired digital zoom level at the desired digital resolution, which in some examples, may be defined in terms of a threshold digital zoom level that approximates the threshold number of pixels. In some examples, the upsampling threshold may correspond to a digital zoom level that is less than a predefined binning transition threshold or a camera transition threshold.

Camera processor 14 may perform upsampling in response to the upsampling threshold being satisfied until a binning transition threshold or camera transition threshold is satisfied by a user increasing or decreasing the desired digital zoom level. In any event, the upsampling threshold may be set so as to correspond to a desired resolution parameter of camera 15 or computing device 10, such that camera processor 14 may achieve the desired digital zoom level at the desired resolution by upsampling the output pixels received from image sensor 12. A person skilled in the art would understand that upsampling (or downsampling) may be used in conjunction with digital cropping techniques to achieve a desired digital zoom level at a desired resolution.

In some examples, the amount of cropping, downsampling, and upsampling that camera processor 14 will perform as part of the digital zoom depends on the size of image sensor 12 and the desired output resolution. For example, where image sensor 12 is able to provide more output pixels compared to the desired output resolution, camera processor 14 may perform cropping and downsampling to achieve the desired zoom level at the desired output resolution. As the zoom level increases, camera processor 14 may crop and then as the zoom level increases more, camera processor 14 may perform cropping and upsampling to achieve the desired zoom level at the desired output resolution.

In a non-limiting example, the predefined binning transition threshold is a 2× zoom transition threshold, such that when the desired digital zoom level is at or above 2× zoom relative to the optical zoom level provided by the current lens 13 being used, camera processor 14 can determine that the zoom level satisfies the predefined binning transition threshold. In other examples, the predefined threshold is a 1.5× zoom level, 3× zoom level, 5× zoom level, etc. In some examples, camera processor 14 may set the predefined binning transition threshold based on zoom levels at which camera processor 14 uses digital zoom techniques, such as upsampling, downscaling, cropping and/or scaling, to an extent that exceeds a desirable amount. For example, camera processor 14 may set the predefined binning transition threshold based on a maximum allowable upsampling amount.

In the example of FIG. 2B, camera processor 14 may cause image sensor 12 to capture the second frames 212 using a non-binning level. For example, image sensor 12 may capture second frames 212 using a non-binning mode (210A/210B). In such examples, image sensor 12 may use non-binning to capture frames 212, causing the output frame to be four times larger than binned frame 206. This is illustrated by the transition from the first one or more frames 206 to the second one or more frames 212, where frame 212 is four times larger than frame 206 on account of image sensor 12 transitioning from a 4-pixel binning mode to a non-binning mode.

In some examples, image sensor 12 may then determine a reduced portion 214 of captured pixels to output to camera processor 14. Image sensor 12 may output the reduced portion 214 either as binned or in some cases, non-binned pixel values. In the example of FIG. 2B, image sensor 12 may output the reduced portion 214 as unbinned pixels in accordance with the non-binning level. In such examples, image sensor 12 may simply ignore certain outside pixels and then, transfer the reduced portion of pixels 214 to camera processor 14. In some examples, the camera processor may perform digital zoom operations (e.g., cropping, upsampling, scaling, etc.) after receiving the reduced portion of pixels from image sensor 12.

The size of reduced portion 214 may depend on the difference between the first binning level and the second binning level. In some examples, image sensor 12 may determine the difference in output pixels and determine the reduced portion based on a ratio between the difference in pixel numbers. As an illustrative example, the reduced portion 214 is equal in size to the binned scene of frame 206. As shown in the example of FIG. 2B, image sensor 12 may transition from 4-pixel binning to non-binning, in which case, image sensor 12 may determine the reduced portion as 25% of the full frame 212. In addition, the reduced portion 214 may include a center of second frame 212 (e.g., the center 25% of frame 212). In some examples, reduced output portion 214 has the same aspect ratio as image sensor 12, as shown in FIG. 2B.

In an illustrative example, camera processor 14 may receive a zoom request for two times (2×) zoom, the 2× zoom request being 2× the zoom of the optical zoom level that corresponds to a current lens 13 in operation. For example, the 2× zoom request may refer to 2× the optical zoom level of a first lens of a mobile device. In response, camera processor 14 may cause image sensor 12 to transition binning levels, capture image data using the transitioned binning level, determine a reduced portion of the captured pixels, and transfer the reduced portion of pixels to camera processor 14.

In some examples, image sensor 12 may output a reduced portion of the binned pixels to camera processor 14 following a transition from one binning level to another binning level. For example, a 16MP image sensor 12 performing 2×2 binning can normally output 4MP binned pixels to camera processor 14. However, image sensor 12 may only output an inner portion of the binned pixels to camera processor 14 in order to maintain a constant or near constant data throughput rate from image sensor 12 to camera processor 14 from one binning level to another binning level.

As another non-limiting example, image sensor 12 may transition from 4-pixel binning to 2-pixel binning (e.g., horizontal binning), in which case, image sensor 12 may determine reduced output portion 214 as 50% of the full frame 212 (two pixels divided by four pixels). In any event, the predefined binning transition threshold may be set such that the maximum bandwidth of the camera processor 14 is similar between binning levels. This is because image sensor 12 does not output the full amount of pixels following a binning transition and thus, fewer pixels are transferred to camera processor 14.

As discussed above, the difference between binning levels may depend, in some circumstances, on the desired resolution and/or the bandwidth of camera processor 14. Camera processor 14 may set the difference between binning levels so as to limit the amount of upsampling and/or scaling used depending on the size of image sensor 12 in comparison to the desired resolution without overburdening camera processor 14. As mentioned before, upsampling causes distortions in video and other image data because the interpolation between pixel values is not always accurate and thus, incorrect pixel values may be introduced into the image data. These distortions can degrade a high-resolution video shot at a high frame rate, and thus, it is advantageous for the camera processor 14 to perform as little upsampling as possible. The disclosed technology improves distortion while zooming and also keeps throughput high within a range so as to avoid spikes in the throughput level.

FIGS. 3A and 3B are diagrams illustrating how the image sensor of FIG. 1 may perform various binning operations at the pixel sensor level. FIG. 3A first illustrates a portion of the pixel sensors of image sensor 12 (302A). Color pixel sensors are denoted by the red—"R"—blocks, green—"G"—blocks, and blue—"B"—blocks. Although a particular array pattern is shown, the shown pattern is merely one example, and the array patterns may be arranged according to any other pattern, orientations, and to include other colors. That is, the techniques of this disclosure may be used for various other array configurations and binning techniques, as illustrated in the other visual depiction of FIG. 6.

FIG. 3A illustrates a first binning level of image sensor 12. In some examples, potential binning levels may include at least one of: a vertical binning mode, a horizontal binning mode, a 2×2 binning mode, a 3×3 binning mode, a 4×4 binning mode, an 8×8 binning mode, etc. or combinations thereof. In such examples, differences in binning levels may be categorized based on the difference between the number of pixels used for each output pixel for each binning level. For example, 2×2 binning mode involves combining four pixels, whereas 3×3 binning mode involves combining nine pixels, and thus, the difference being five pixels for every nine pixels. In some examples, image sensor 12 may combine pixels by averaging pixel values for each pixel sensor. For example, image sensor 12 may use a weighted average for the pixels. Image sensor 12 may also determine a summation of pixel values in determining a combined pixel value. A person of skill in the art will understand that any number of known binning techniques may be used to combine pixels. In any event, the first capture mode, including the first binning level, provides a lower pixel density compared to that of the second image capture mode, including the second binning level.

In the example of FIG. 3A, the binning level may be one of 2×2 pixel binning, in which case, image sensor 12 combines four neighboring pixels (e.g., a 2×2 square of R, G, and G, B pixels) into one output pixel (302B). The example of FIG. 3A shows four pixels in the process of being combined into a single pixel. In some examples, FIG. 3A shows the interim stages of combining multiple pixels into fewer output pixels (302B). For example, four neighboring R, G, B, G pixels in the upper left of image sensor 12 may be averaged to arrive at a single R output pixel. The final reduced size is not shown in FIG. 3A, but upon combining the output pixels (302B), the output pixels (302B) would comprise 25% less pixels compared that of the image 12 (302A) as a result of the 2×2 binning (or 4-to-1 binning).

FIG. 3B illustrates an example binning level that uses fewer pixels of image sensor 12 relative to the first binning level for each output pixel of the image data. As discussed, camera processor 14 may cause image sensor 12 to transition from a first binning level to a second binning level when a zoom level satisfies a predefined binning transition threshold. In the example of FIG. 3B, the second binning level may be a non-binning level, in which case, image sensor 12 may use one pixel of image sensor 12 (304B) for each output pixel (304C) of the image data. Image sensor 12 may transfer output pixels (304C) to camera processor 14.

It should be noted that while certain examples of this disclosure refer to certain pixel binning types and pixel binning levels, the techniques of this disclosure are not so limited, and any number of proprietary or non-proprietary pixel binning types may be utilized in accordance with the techniques of this disclosure, as well as levels or degrees within those pixel binning types.

Figure 4A:
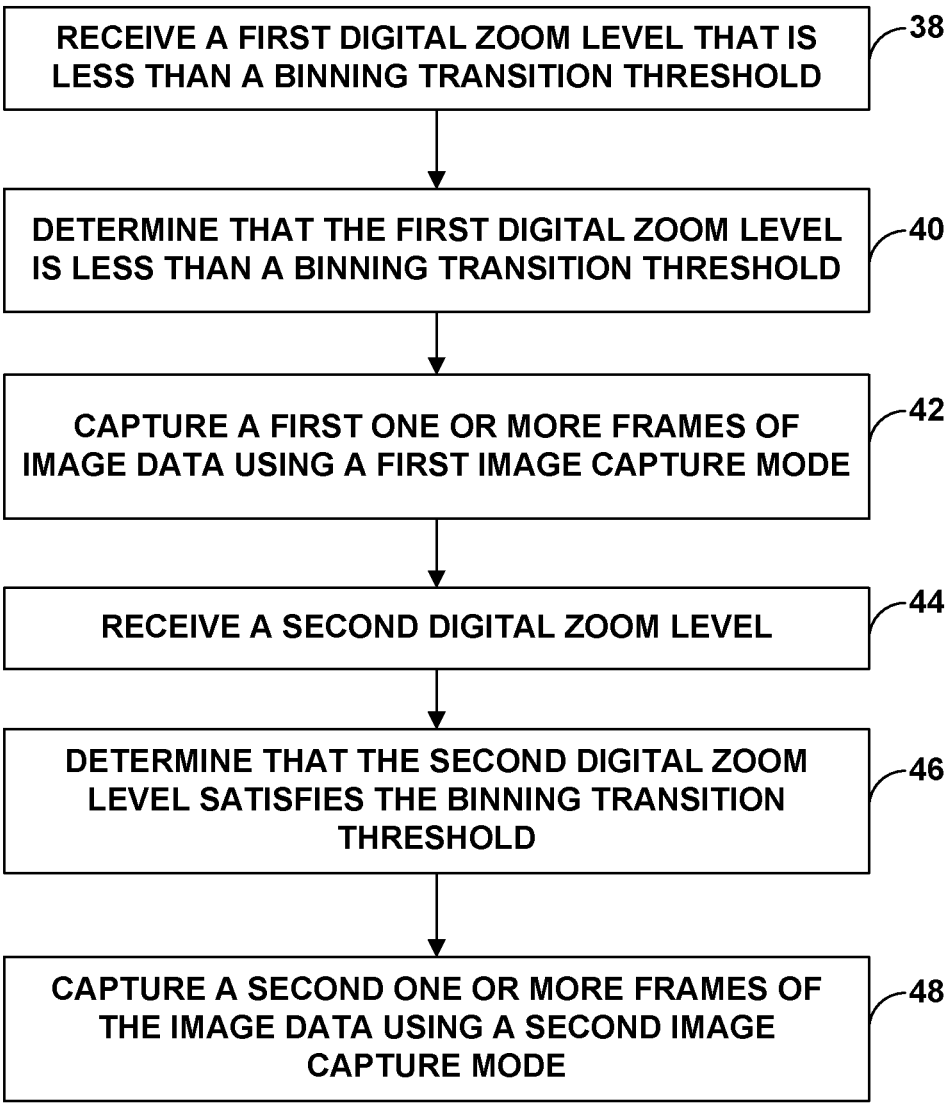
FIG. 4A is an example flow diagram illustrating example operations of the camera processor and image sensor shown in FIG. 1 in performing zoom operations in accordance with various aspects of the techniques described in this disclosure.

FIG. 4A is an example flow diagram illustrating example operations of camera processor 14 and image sensor 12 shown in FIG. 1 performing zoom operations using various binning levels. Camera processor 14 may receive a first zoom level that is less than a binning transition threshold (38). In some examples, the zoom level may be user defined. In some examples, the zoom level may be automatically defined, such as by a camera application and/or with the support of artificial intelligence (AI). The first zoom level may be a zoom level that is greater than 1.0× relative to the optical zoom provided by whichever lens 13 is currently being used. In some examples the zoom level may be relative to a default lens 13. In some examples, the zoom level may be 1.0×, which indicates to camera processor 14 that there is currently no digital zoom request present. In another example, the zoom level may include a requested zoom level that automatically satisfies a binning transition threshold, such as in the case of a default zoom level that is greater than or equal to a particular binning transition threshold.

In any case, camera processor 14 may then determine whether the first digital zoom level is less than, greater than or equal to a binning transition threshold (40). For example, the binning transition threshold may be predefined to be satisfied when the digital zoom level is greater than or equal to a 2× zoom level relative to the optical zoom provided by a particular lens 13. As such, camera processor 14 may perform a comparison of the digital zoom level to the binning transition threshold to determine whether the binning transition threshold is satisfied. If the first digital zoom level is less than the binning transition threshold, camera processor 14 may cause image sensor 12 to capture a first one or more frames of image data, such as video data, using a first image capture mode (42).

In some examples, the first image capture mode may include binning levels for a plurality of image sensors 12, where the binning levels may be different for each image sensor 12 or the binning levels may be the same for two or more image sensors 12. For example, a first binning level of a first image capture mode may include 4×4 binning with respect to a first image sensor 12, whereas the first image capture mode may further include a 2×2 binning level with respect to a second image sensor 12. In some examples, the first binning level of the first image capture mode may include 4×4 binning with respect to a first image sensor 12 and 4×4 binning level with respect to a second image sensor 12. A person of skill in the art will understand that these binning levels are provided for example. The binning levels may be different in various other examples. In any event, the first image capture mode may include using two or more pixels of the respective image sensor 12 for each output pixel of the image data.

In one example, the first image capture mode may include a first binning level that uses two or more pixels of image sensor 12 for each output pixel of the image data. For example, the first binning level may include 8×8 pixel binning where image sensor 12 uses sixty-four pixels for each output pixel of the image data, 4×4 pixel binning where image sensor 12 uses sixteen pixels for each output pixel of the image data, 2×4 pixel binning where image sensor 12 uses eight pixels for each output pixel of the image data, 2×1 pixel binning where image sensor 12 uses two pixels for each output pixel of the image data, etc. Image sensor 12 may output the binned pixels to camera processor 14 for further processing to achieve the desired digital zoom level.

In some examples, camera processor 14 may receive a second digital zoom level (44). For example, a user may be increasing the digital zoom level from the first level to the second level. In other examples, camera processor 14 may receive the second digital zoom level as a default zoom level upon initialization of a camera application. Although described in terms of a user increasing zoom levels, a person skilled in the art would understand that the techniques are not so limited, and that similar processes may be used for the reverse scenario where a user is decreasing a desired digital zoom level. For example, camera processor 14 may receive the second digital zoom level and may decrease the digital zoom level to a subsequently requested digital zoom level that is less than the second digital zoom level. In such examples, the subsequently requested digital zoom level may include the first level that results in camera processor 14 causing image sensor 12 to capture frames of image data using the first image capture mode.

In some examples, the second digital zoom level may include a requested digital zoom level. The requested digital zoom level may include a requested zoom level determined received by camera processor 14 as user input. In some examples, the requested digital zoom level may include a requested digital zoom level that is automatically requested, such as by camera processor 14 or a camera application. For example, the requested digital zoom level may be a default zoom level that a camera application uses upon initial launch of the camera application. In a non-limiting example, the requested digital zoom level may include a 2× digital zoom level that serves as a default zoom level for a particular camera application.

Camera processor 14 may determine whether the second digital zoom level is less than, greater than or equal to the binning transition threshold (46). If the second digital zoom level is greater than or equal to the binning transition threshold, camera processor 14 may cause image sensor 12 to capture a second one or more frames of image data, such as video data, using a second image capture mode (48).

In an illustrative and non-limiting example, a binning transition threshold may define a zoom threshold at a 2× zoom level. The second digital zoom level (e.g., the requested digital zoom level) may include a default request for a 2× zoom level. In such examples, camera processor 14 may determine that the binning transition threshold is satisfied by the second digital zoom level being greater than or equal to the binning transition threshold. That is, a camera application might, by default, open to a particular zoomed-in level, such as a 2× zoom level. In such examples, the camera may start by using the second image capture mode (e.g., a non-binning level). In such examples, camera processor 14 may determine a second requested zoom level that includes a desired zoomed-out level (e.g., to a <2× zoom level). As such, camera processor 14 may cause image sensor 12 to capture subsequent frames using the first image capture mode. In such examples, frames of image data may first be captured using a second image capture mode. Following the zoom-out request of this illustrative example that satisfies a binning transition threshold, camera processor 14 may cause image sensor 12 to capture subsequent frames of image data using the second image capture mode. In some examples, the image data may include video data or still-image data. For example, camera processor 14 may use the captured frames, at least in part, to record video data. In such an example, camera processor 14 may encode the video data and/or store the video data, such as to system memory 30. In another example, camera processor 14 may use the captured frames, at least in part, to provide an image preview via user interface 22 on display 28.

In some examples, the second image capture mode may include a second binning level or non-binning level for a plurality of image sensors 12. For example, the second binning level of the second image capture mode may include non-binning with respect to the first image sensor 12 and also non-binning with respect to the second image sensor 12. A person of skill in the art will understand that non-binning levels are provided for example. The second binning levels may, in some examples, include binning levels that use two or more pixels of the respective image sensors 12. In any event, the second image capture mode includes using fewer pixels of the respective image sensor 12, relative to the first image capture mode, for each output pixel of the image data.

The second image capture mode may include a second binning level that uses fewer pixels of image sensor 12 relative to the first binning level for each output pixel of the image data. For example, the first binning level may include 8×8 pixel binning. As such, the second binning level may include, for example, 4×4 pixel binning, 3×3 pixel binning, 2×4 pixel binning, 2×1 pixel binning, 1×1 pixel binning, or a non-binning level. In a non-limiting example, image sensor 12 may capture the second one or more frames of the image data using non-binning as the second binning level.

In some examples, image sensor 12 may output all or a portion of the binned or non-binned pixels to camera processor 14 for further processing to achieve the desired digital zoom level. For example, image sensor 12 may output a portion of the binned or non-binned pixels depending on the difference between the first pixel binning level and the second pixel binning level. In one example where image sensor 12 transitions from 4×4 pixel binning to 2×1 pixel binning, image sensor 12 may output to camera processor 14 a portion of the binned pixels equal to ~12.5% of the 2×1 binned pixels. As such, the output percentage may be determined by taking the number of pixels for each combined pixel of the second binning level (e.g., 2 for 2×1 binning) and dividing that by the number of pixels for each combined pixel of the first binning level (e.g., 16 for 4×4 binning). In such examples, image sensor 12 may output the center ~12.5% of the 2×1 binned pixels. In some examples, the output portion may be of any dimension (e.g., rectangular, square, etc.) relative to the dimension of image sensor 12.

In another example where image sensor 12 transitions from 2×2 pixel binning to non-binning, image sensor 12 may output to camera processor 14 a portion of the non-binned pixels equal to 25% (e.g., the center 25%). As another example where image sensor 12 transitions from 3×3 pixel binning to non-binning, image sensor 12 may output to camera processor 14 a portion of the binned pixels equal to ~11.1% of the non-binned pixels (e.g., the center ~11.1%).

Figure 4B:
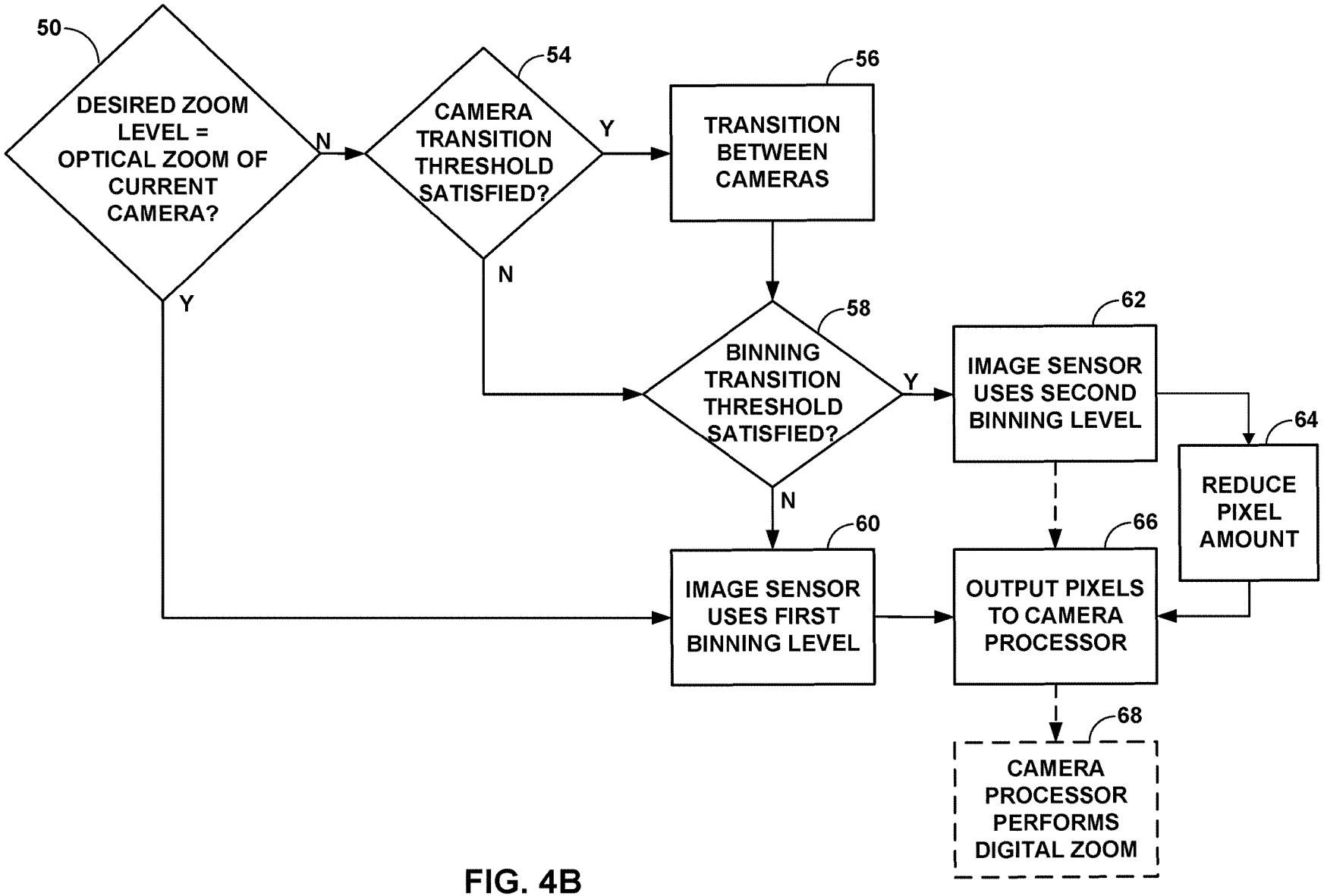
FIG. 4B is an example flow diagram illustrating example operations of the camera processor and image sensor shown in FIG. 1 in performing zoom operations in accordance with various aspects of the techniques described in this disclosure.

FIG. 4B is an example flow diagram illustrating example operations of camera processor 14 and image sensor 12 performing zoom operations using various binning levels with multiple lenses 13. In examples including multiple cameras 15, camera processor 14 can determine whether a desired zoom level exceeds the optical zoom level of a current camera 15 (50). In some examples, the current camera 15 may include a lens 13 that camera 15 initiates, for example, upon the launching of a camera application. For example, the lens may be a lens having a 1.0× optical zoom level. In some examples, the camera may be a camera already transitioned from another camera based on a desired digital zoom level exceeding a camera transition threshold. In a non-limiting example, the current camera may be a 3.0× optical zoom camera, a 5.0× optical zoom camera or a 10.0× optical zoom camera, that was transitioned from a camera having a 1.0× optical zoom.

In some examples, camera processor 14 may determine that the desired zoom level is equal to or approximately equal to the optical zoom of the current lens. For example, the desired zoom level may be 1.0× where the current lens has a 1.0× optical zoom level. In such instances, camera processor 14 may cause image sensor 12 to simply capture image data, such as video data, using a first binning level (60). For example, the first binning level may include combining multiple pixels into fewer pixels. Image sensor 12 may output the binned pixels to camera processor 14 (66). Because the desired zoom level, in this example, is equal to or was approximately equal to the optical zoom of current lens 13, camera processor 14 may forego performing any digital zoom operations.

If the desired zoom level does not equal the optical zoom of the current camera 15, however, camera processor 14 may determine that a desired zoom level has been requested. For example, a user may request a zoom level of >1.0× relative to the optical zoom level of the current camera 15.

Camera processor 14 may determine whether the desired zoom level satisfies a camera transition threshold (54). A camera transition threshold may be related to the particular configuration of lenses 13, such that each lens 13 may be used at various zoom levels. For example, if the camera transition threshold is a 3× zoom level to transition to another camera, camera processor 14 may compare the desired zoom level to the camera transition threshold to determine whether the cameras should be switched. If the zoom level does not exceed the camera transition threshold, camera processor 14 may continue to use the current camera.

If a desired zoom level satisfies the camera transition threshold, camera processor 14 may transition between cameras (56). In some examples, camera processor 14 of a first camera 15 may cause a transition from first camera 15 to a second camera 15. In some examples, second camera 15 may include a different camera processor 14 or may include the same camera processor 14. In a non-limiting example, first camera 15 may have a first lens 13 and first sensor 12, whereas second camera 15 may have a second lens 13 and second image sensor 12. In another example, second camera 15 may also include the first lens 13. For example, second camera 15 may include light guides (e.g., moving prisms, mirrors, etc.) that redirect light from at least the first lens 13 to a second image sensor 12. In another example, second camera 15 may include first image sensor 12 paired with a different lens 13. In another example, first camera 15 may be paired with a combination of a first lens 13 and a second lens 13, whereas second camera 15 may be paired with second lens 13 or a combination of the second lens 13 and a third lens 13, etc. While several examples are provided, a person skilled in the art will appreciate that various combinations are available for combining one or more lenses 13 and one or more image sensors 12 to achieve various effective focal lengths for configuring camera 15.

Camera processor 14 may determine whether the desired zoom level satisfies a binning transition threshold (58). If the desired zoom level does not satisfy the binning transition threshold, camera processor 14 may cause image sensor 12 to use a first binning level that uses two or more pixels of image sensor 12 for each of a plurality of output pixels of the image data (60). If, however, the desired zoom level does satisfy the binning transition threshold, camera processor 14 may cause image sensor 12 to transition to a second binning level that uses fewer pixels of image sensor 12 relative to the first binning level for each output pixel of the image data (62). For example, camera processor 14 may determine satisfaction of the predefined binning transition threshold when the desired digital zoom level is greater than or equal to a predefined threshold zoom level.

In some examples, camera processor 14 may determine that a camera transition threshold has been satisfied in response to a requested zoom level. Upon determining that the camera transition threshold has been satisfied, camera processor 14 may transition from a first camera 15 to a second camera 15. In some examples, the first camera 15 and the second camera 15 may differ based on the image sensor 12 used, lens 13 used, or some combination thereof. Upon transitioning to the second camera 15, camera processor 14 may cause the image sensor 12 that corresponds to the second camera to use a binning level that causes the number of output pixels transferred to camera processor 14 to match the number of output pixels that were transferred to camera processor 14 from the previous image sensor 12. In some examples, image sensor 12 of the second camera 15 may use a non-binning level.

In one illustrative example, a first camera 15 may have a first image sensor 12 comprising 108MP. The first image sensor 12 may transition from 2×2 binning to non-binning in response to a first predefined binning threshold being met (e.g., 2× zoom). The 108MP sensor 12 may transfer a reduced portion of the non-binned pixels to camera processor 14, such as the center quarter of the non-binned pixels. As such, the first image sensor 12 may output 27MP to camera processor 14 at the first predefined binning threshold. As the zoom level increases further, the first image sensor 12 may output a smaller number of non-binned pixels to camera processor 14 proportional to the increasing zoom level, assuming the desired pixel resolution does not cause the amount of upsampling to exceed a threshold upsampling amount.

In an example, at 3× zoom relative to the optical zoom level of the first camera 15, the first image sensor 12 may output the center one-ninth of the non-binned pixels to the camera processor. That is, the first image sensor may output 12MP of non-binned pixels to the camera processor. If a camera transition threshold is to cause a transition at 3× zoom from the first camera 15 to a second camera 15 having a second image sensor 12 comprising 12MP, then following the transition to the second camera 15, the second image sensor 12 may use a binning level that matches the previous number of output pixels. For example, the second image sensor 12 may use one or more pixels of the image sensor for each output pixel, such as a 2×2 binning level or non-binning level. In this particular example, the second image sensor 12 may use a non-binning level following the camera transition because the second image sensor 12 comprises the same number of pixels as was being transferred from the first image sensor 12 leading up to the camera transition (e.g., 12MP). As such, the number of pixels of image sensor 12 corresponding to the second camera 15 that are used for each output pixel may be based on a difference between the total number of pixels available for each image sensor 12, such that the throughput may remain constant or near constant.

In some examples, image sensor 12 may transition back to binning upon detecting a transition to a different camera (e.g., a 5× zoom camera, 10× zoom camera, etc.) and the process of altering binning levels may repeat as a next binning transition threshold is satisfied with respect to the transitioned lens. An example camera transition may include transitioning from a first camera 15 comprising an 18MP image sensor 12 to a second camera 15 comprising a 108MP image sensor 12. In such examples, following the camera transition from the first camera 15 to the second camera 15, camera processor 14 may cause the 108MP image sensor corresponding to the second camera 15 to use a 6-to-1 pixel binning level (e.g., 3×2 binning) in order to keep a constant bit rate between camera transitions of 18MP. The 108MP image sensor 12 may then transition to a different binning level as the digital zoom level increases and output a reduced portion of pixels to camera processor 14, in accordance with techniques of this disclosure.

In an illustrative example, camera processor 14 may cause a transition from a first camera 15 comprising a 12MP image sensor (e.g., wide-angle lens) to a second camera 15 comprising a 12MP image sensor (e.g., ultra-wide angle lens) according to a first camera transition threshold. In a non-limiting example, the first camera transition threshold may be satisfied by a requested digital zoom level of less than or equal to a 0.5× zoom level. In addition, camera processor 14 may cause a transition from the second camera 15 to a third camera 15 comprising a 12MP image sensor (e.g., telephoto lens) according to a second camera transition threshold. In a non-limiting example, the second camera transition threshold may be a zoom level greater than 1.0× zoom, such as 1.2× zoom, 2.0× zoom, 5.0× zoom, 10.0× zoom, etc.

In this example, camera processor 14 may cause the first camera 15 to capture image data using a first binning level (e.g., 2×2 binning) and output binned pixels to camera processor 14. Camera processor 14 may determine satisfaction of the first camera transition threshold and transition to the second camera 15, where camera processor 14 may cause the second camera 15 to capture image data using the first binning level and output binned pixels to camera processor 14. Camera processor 14 may transition from the second camera 15 to the third camera 15 in response to determining satisfaction of the second camera transition threshold or in some examples, may transition from the second camera 15 to the first camera 15 in response to determining satisfaction of the first camera transition threshold. It should be understood that regardless of whether the transition is from the first camera 15 to the third camera 15 or the second camera 15 to the third camera 15, computing device 10 may nevertheless utilize the techniques of this disclosure, such that camera processor 14 may determine various binning levels, binning transition thresholds, reduced output portions, and camera transition thresholds for implementation of the various cameras at various desired digital zoom levels.

For example, in the above illustrative example, the first camera 15 may capture image data using a 4-pixel binning level. As the digital zoom level exceeds a binning transition threshold, the first camera 15 may transition to a second binning level (e.g., non-binning level) and output 25% of the binned pixels to camera processor 14. As the digital zoom level exceeds a camera transition threshold, the first camera 15 may transition to, in this example, the third camera 15. Camera processor 14 may cause the 12MP image sensor corresponding to the third camera 15 to capture image data using a 4-pixel binning level.

In such examples, the image sensors 12 may maintain a near constant throughput to camera processor 14 between camera transitions. That is, a 12MP image sensor 12 of a first camera 15 using non-binning as the second binning level may output a reduced portion of non-binned pixels to camera processor 14. In examples where the reduced portion is 25%, the image sensor 12 of the first camera 15 may output 3MP for each frame of image data to camera processor 14. Likewise, following a camera transition to the third camera 15, the camera processor 14 may cause the 12MP image sensor 12 of the third camera 15 to capture image data using 2×2 binning and output 100% of the binned pixels. In this illustrative example, the camera processor 14 may receive 3MP for each frame from both 12MP image sensors 12 before and after the camera transition.

A person of skill in the art will appreciate that the above example is one example illustrating a transition between image sensors 12 that may result in camera processor 14 causing the transitioned sensor 12 to capture image data using a binning level that uses more than one pixel for each output pixel, and that the techniques of this disclosure may be used in examples where the binning level following a particular camera transition is a non-binning level or as in other examples of this disclosure, a binning level that uses more than one pixel for each output pixel. In some examples, camera processor 14 may determine an amount of pixel binning to use following a camera transition based on the purpose of the transitioned camera. For example, a transitioned camera may be used to perform extreme zoom operations, where binning at extreme zoom levels may be undesirable due to the ability of the human eye to perceive binning at high zoom levels. Thus, camera processor 14 may not perform binning when transitioning to a camera configured to perform extreme zoom operations (e.g., 5.0× optical zoom, 10.0× optical zoom, etc.).

Upon capturing image data using the second binning level, image sensor 12 may reduce the amount of captured pixels prior to transferring the pixels to camera processor 14 (64). For example, image sensor 12 may ignore the outer 75% of the pixels and output the inner 25% of the pixels to camera processor 14. Image sensor 12 may reduce an amount of pixels captured using the second binning level in order to maintain a constant or near constant throughput rate between image sensor 12 and camera processor 14. In some examples, the above operation of transferring a reduced portion of unbinned pixels following a binning transition may allow camera processor 14 to forego performing digital cropping because the received pixels align with the desired zoom level. However, camera processor 14 may still need to perform upsampling, downsampling, or scaling depending on the size of image sensor 12 as compared to the desired resolution.

Image sensor 12 may then output the binned pixels or non-binned pixels to camera processor 14 (66). In the case of the second binning level being used, image sensor 12 may output the reduced portion of pixels to camera processor 14. In some examples, camera processor 14 may perform a digital zoom operation including cropping, upsampling, scaling, and/or combinations thereof, to achieve the desired digital zoom level (68). Camera processor 14 may perform the digital zoom operation on the reduced pixel amount received from image sensor 12. Optionally, camera processor 14 may perform digital zoom operations on the reduced pixel amount received from image sensor 12 to achieve the desired digital zoom level (68). For example, camera processor 14 may perform cropping, upsampling, scaling, etc., and/or combinations thereof.

A person of skill in the art would understand that image captures may include a snapshot capture or a video stream capture. For example, one or more cameras 15 of computing device 10 may implement the operations shown in FIGS. 4A-4B while recording video, providing an image preview (e.g., before a user takes a photo), still photos, pictures-in-video, motion photos, etc.

Figure 5A:
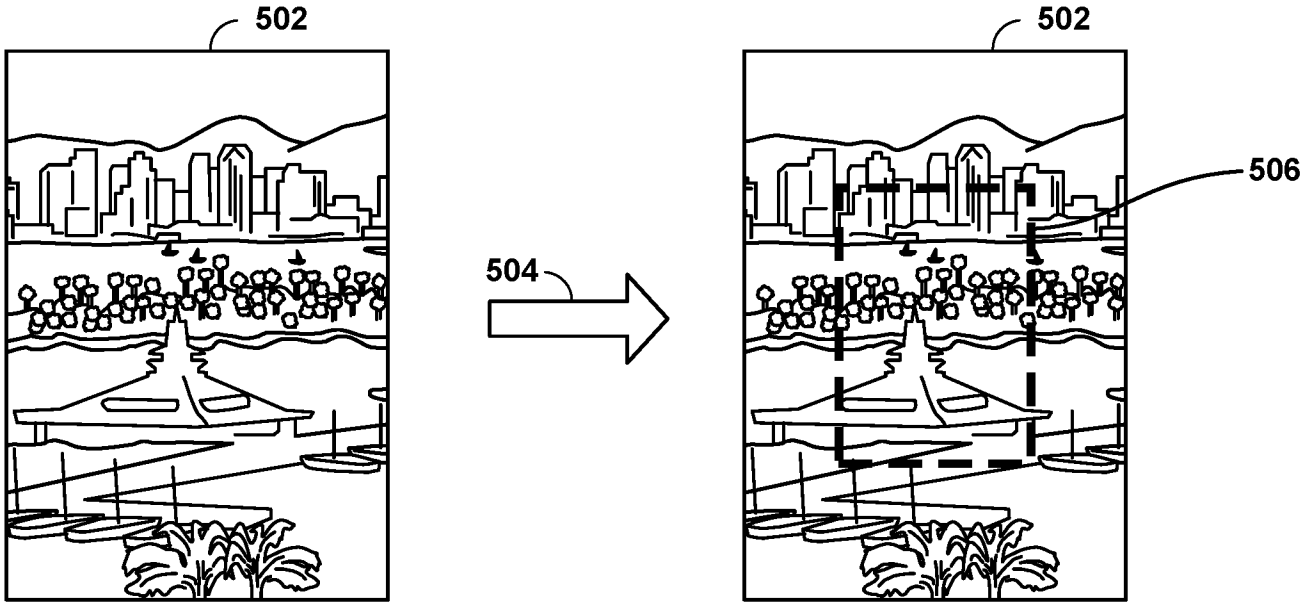
FIGS. 5A-5C illustrate additional example images illustrating various complex zoom operations involving multiple cameras in accordance with various aspects of the techniques described in this disclosure.
Figure 5B:
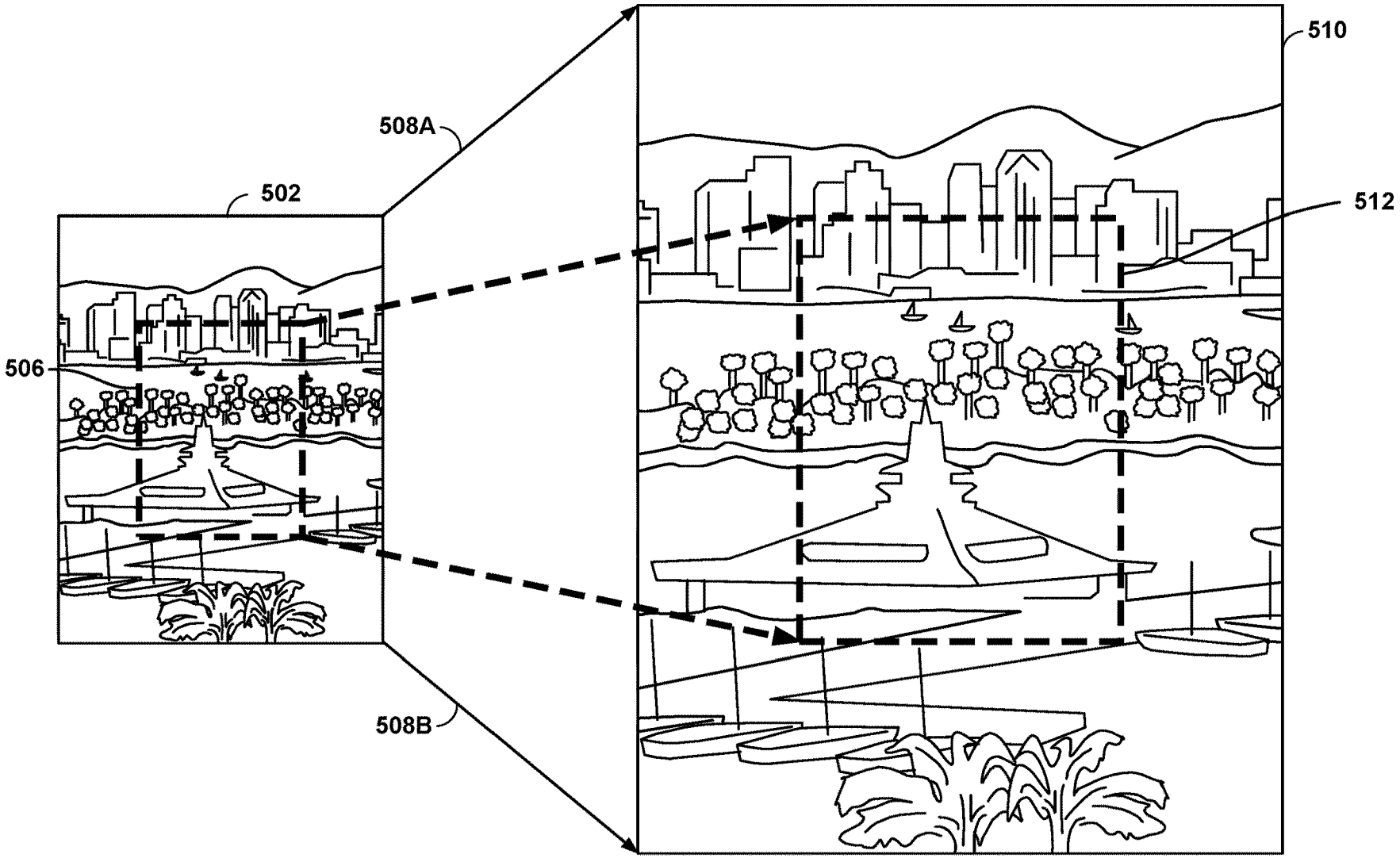
Figure 5C:
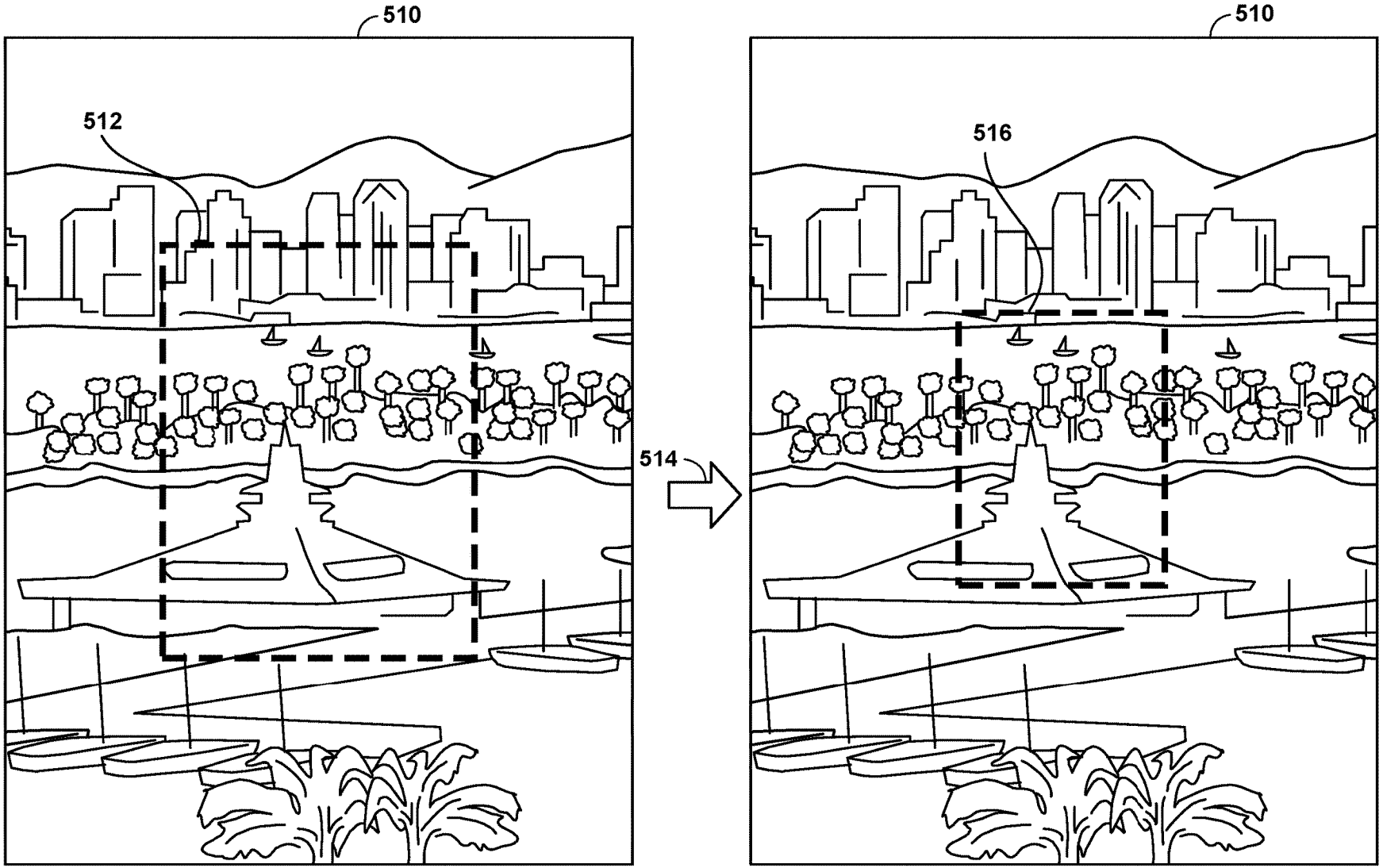

FIGS. 5A-5C are diagrams illustrating additional example operation of the camera processor shown in FIG. 1 in performing certain zoom techniques and transitions between binning levels. Referring first to the example of FIG. 5A, camera processor 14 may cause image sensor 12 to use a first binning level to capture image data as a first frame 502. In an illustrative example, image sensor 12 may be a 108MP image sensor performing 2×2 binning to achieve a 27MP frame for 502. Arrow 504 represents a desired 2× zoom level relative to the optical zoom of the current lens 13. For example, the user may increase the zoom level to 2× zoom (506), which in the example of FIG. 5A, represents a predefined binning transition threshold. As a result, camera processor 14 may cause image sensor to capture the next frame using a second binning level (508A/508B).

FIG. 5B illustrates frame 502 from FIG. 5A, wherein image sensor 12 is using a second binning level (508A/508B) in response to the zoom level satisfying a predefined binning transition threshold to capture frame 510. In keeping with the example of a 108MP image sensor, if image sensor 12 transitions from 2×2 binning to non-binning, frame 510 would include 108MP as non-binned pixels. At this point, image sensor 12 may determine the reduced portion to be a predefined percentage of 25% of the full FOV of image sensor 12, such that the reduced portion represents a partial FOV of image sensor 12. In some examples, the full FOV of image sensor 12 comprises all pixels of image sensor 12, where the pixels are either binned when in binning mode or not binned when in non-binning mode. Image sensor 12 may determine the reduced portion based on the binning level difference. In some examples, image sensor 12 may output the reduced portion 512 to camera processor 14. The cropped portion may be proportional to the difference in binning levels. A cropped portion 512 being 25% of the full FOV would cause image sensor 12 to output frame 512 as having a 27MP image data size.

In some examples, computing device 10 may include multiple lens(es) 13 and/or multiple image sensors 12 that may activate at various zoom levels or camera transition thresholds. For example, computing device 10 may be a triple lens camera. In some examples, the triple lens camera may include a wide lens and sensor combination (e.g., 108MP), an ultra-wide lens and sensor combination (e.g., 16MP), and a telephoto lens and sensor combination (e.g., 12MP). In a non-limiting example, camera processor 14 may activate the telephoto lens 13 at a zoom level of 3× zoom relative to an optical zoom level of a previous lens 13. While the example of FIG. 5C illustrates zoom levels leading up to a 3× zoom camera transition threshold, FIG. 5C illustrates image sensor 12 of a current camera 15 prior to the camera transition to another camera 15 that provides the 3× zoom. FIG. 5C is intended to illustrate that leading up to the camera transition threshold, image sensor 12 of the 108MP lens may still output 12MP at 3× zoom (516), such that during the transition between cameras 15, the throughput (e.g., bit rate) remains constant or near constant between image sensors 12 and camera processor 14.

In the example of FIG. 5C, arrow 514 represents a zoom increase of 3× zoom, where a transition to the telephoto lens would be set to occur. In such instances, image sensor 12 of the current lens may include a 108MP image sensor 12, in which case at 3× zoom, image sensor 12 may determine a reduced portion 516 of pixels as 12MP or one-ninth the full number of unbinned pixels of image sensor 12. Therefore, a 108MP wide camera may still output 12MP at 3× zoom just before camera processor 14 transitions to telephoto lens for 3× zoom, such that the throughput remains constant or near constant during the transition.

Upon transitioning between imaging devices (e.g., lens, image sensors, etc.) has occurred, camera processor 14 may cause image sensor 12 to use another binning level to capture frames of image data. For example, camera processor 14 may cause image sensor 12 to use a binning level that corresponds to the binning level used for a previous lens. In a non-limiting example, image sensor 12 for a first one of lenses 13 may transition from 2×2 binning to non-binning, where image sensor 12 for a second one of lenses 13 may transition back to 2×2 binning following the camera transition. The process may continue in that camera processor 14 may determine that a zoom level satisfies another predefined binning transition threshold greater than the camera transition threshold. In response, camera processor 14 may cause image sensor 12 to use a second image capture mode (e.g., various binning levels, non-binning etc.) to capture additional frames of image data.

Figure 6:
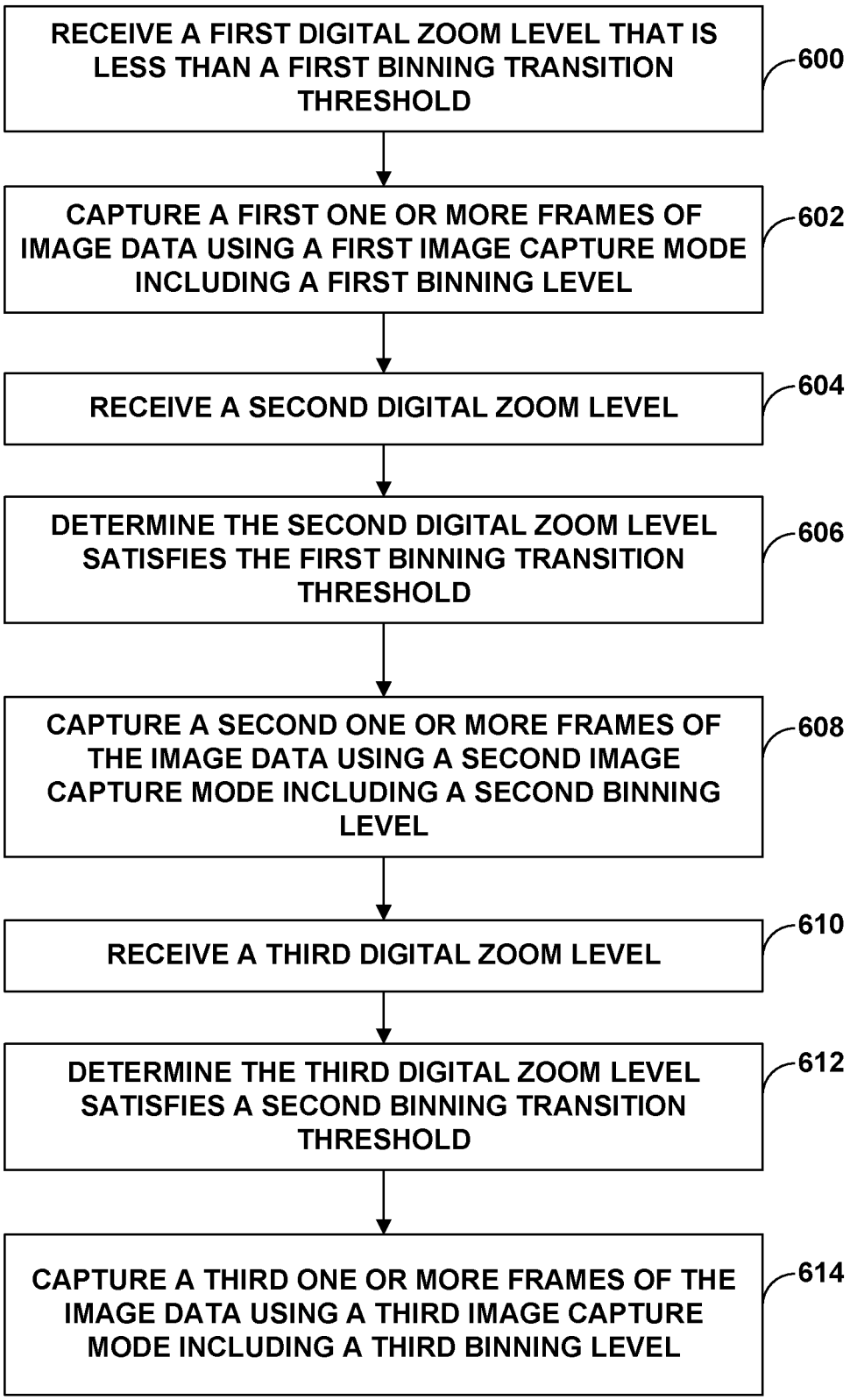
FIG. 6 is an example flow diagram illustrating example operations of the camera processor and image sensor shown in FIG. 1 performing multiple binning transitions during zoom operations in accordance with various aspects of the techniques described in this disclosure.

FIG. 6 is an example flow diagram illustrating example operations of camera processor 14 and image sensor 12 shown in FIG. 1 performing zoom operations using multiple binning transitions. Camera processor 14 may receive a first zoom level that is less than a first binning transition threshold (600). In some examples, the zoom level may be user defined. The first zoom level may be a zoom level that is greater than 1.0× relative to the optical zoom provided by whichever lens 13 is currently being used. In some examples the zoom level may be relative to a default lens 13. In some examples, the zoom level may be 1.0×, which indicates to camera processor 14 that there is currently no digital zoom request present.

If the first digital zoom level is less than the first binning transition threshold, camera processor 14 may cause image sensor 12 to capture a first one or more frames of image data, such as video data, using a first image capture mode (602). The first image capture mode may include a first binning level that uses two or more pixels of image sensor 12 for each output pixel of the image data. For example, the first binning level may include 8×8 pixel binning where image sensor 12 uses sixty-four pixels for each output pixel of the image data, 4×4 pixel binning where image sensor 12 uses sixteen pixels for each output pixel of the image data, 2×4 pixel binning where image sensor 12 uses eight pixels for each output pixel of the image data, etc. Image sensor 12 may output the binned pixels to camera processor 14 for further processing to achieve the desired digital zoom level.

In some examples, camera processor 14 may receive a second digital zoom level (604). For example, a user may be increasing the digital zoom level from the first level to the second level. Although described in terms of a user increasing zoom levels, a person skilled in the art would understand that the techniques are not so limited, and that similar processes may be used for the reverse scenario where a user is decreasing a desired digital zoom level.

Camera processor 14 may determine whether the second digital zoom level is less than, greater than or equal to the first binning transition threshold (606). If the second digital zoom level is greater than or equal to the first binning transition threshold, camera processor 14 may cause image sensor 12 to capture a second one or more frames of image data, such as video data, using a second image capture mode (608). The second image capture mode may include a second binning level that uses fewer pixels of image sensor 12 relative to the first binning level for each output pixel of the image data. For example, the first binning level may include 3×3 pixel binning. As such, the second binning level may include, for example, 2×2 pixel binning, 2×1 pixel binning, etc. In a non-limiting example, image sensor 12 may capture the second one or more frames of the image data using 2×2 pixel binning as the second binning level.

In some examples, camera processor 14 may receive a third digital zoom level (610). For example, a user may be increasing the digital zoom level from the second level to the third level. Although described in terms of a user increasing zoom levels, a person skilled in the art would understand that the techniques are not so limited, and that similar processes may be used for the reverse scenario where a user is decreasing a desired digital zoom level.

Camera processor 14 may again determine whether the third digital zoom level is less than, greater than or equal to the binning transition threshold (612). If the second digital zoom level is greater than or equal to the second binning transition threshold, camera processor 14 may cause image sensor 12 to capture a third one or more frames of image data, such as video data, using a third image capture mode (614). The third image capture mode may include a third binning level that uses fewer pixels of image sensor 12 relative to the second binning level for each output pixel of the image data. For example, the second binning level may include 2×2 pixel binning. As such, the third binning level may include, for example, 2×1 pixel binning, 1×1 pixel binning, or a non-binning level. In a non-limiting example, image sensor 12 may capture the third one or more frames of the image data using no binning (e.g., non-binning) as the third binning level.

In some examples, image sensor 12 may output all or a portion of the binned or non-binned pixels to camera processor 14 for further processing to achieve the desired digital zoom level (e.g., the first, second, or third digital zoom level). For example, image sensor 12 may output a portion of the binned or non-binned pixels depending on the difference between the first pixel binning level and the second pixel binning level.

Figure 7:
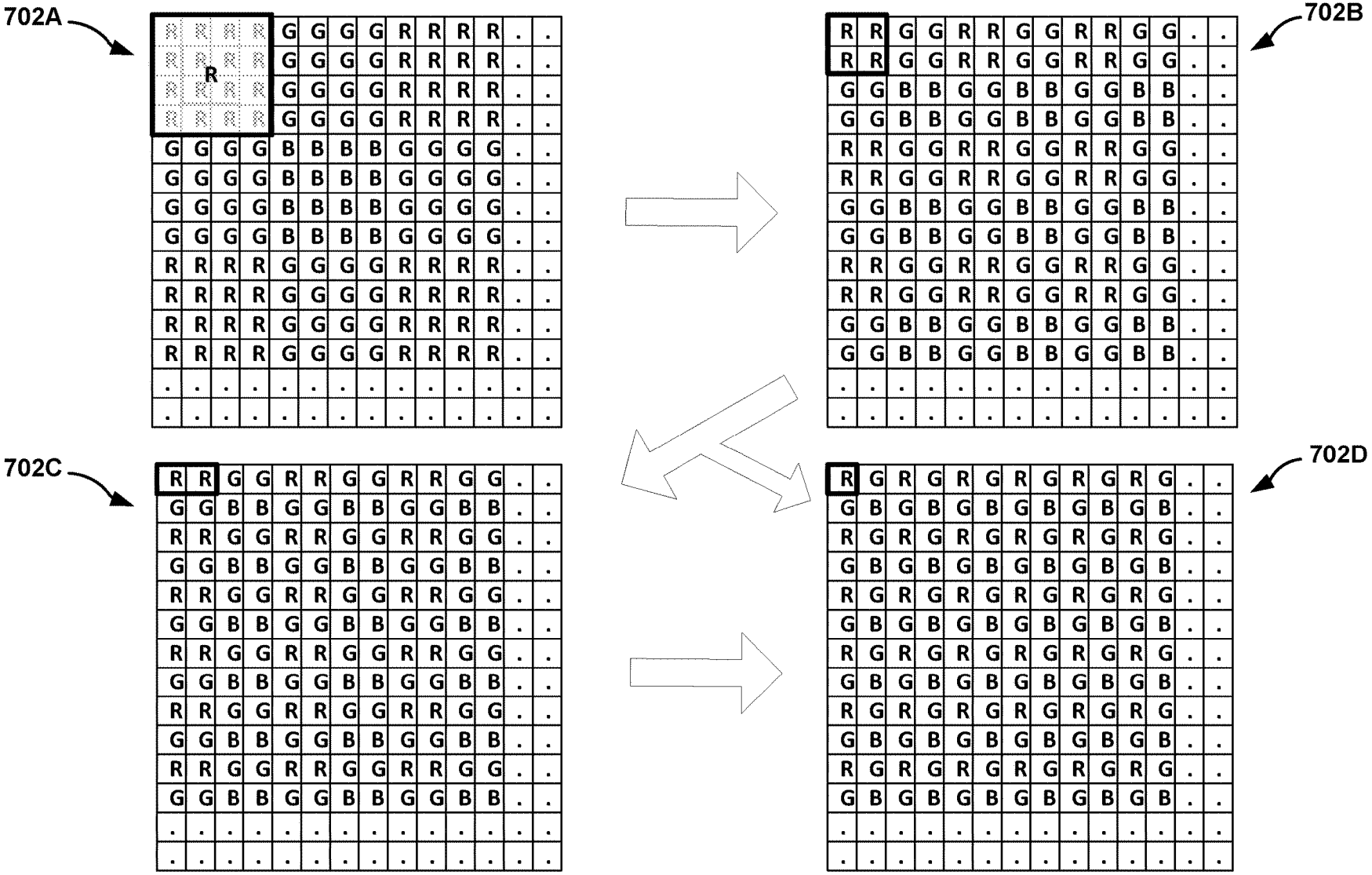
FIG. 7 illustrates another example of transitioning between binning levels in accordance with various aspects of the techniques described in this disclosure.

FIG. 7 illustrates an example of transitioning between multiple binning levels. In some examples, image sensor 12 may be use a first binning level to capture image data. In some examples, the first binning level may include image sensor 12 using at least a predetermined number of pixels, such as five pixels of image sensor 12, for each output pixel of the image data, such that the first binning level may use more pixels for each output pixel compared to a second binning level. In this illustrative example, image sensor 12 may use a 4×4 binning technique as the first binning level (702A). In this example, image sensor 12 may include a pixel array of R, G, and B pixel sensors having an alternating pattern of R, G, and B pixel sensors. In this illustrative example of 4×4 binning, each of sixteen neighboring pixels are combined to form a single output pixel.

Camera processor 14 may cause image sensor 12 to capture image data using another binning mode that uses fewer pixels of the image sensor relative to the first binning level for each output pixel of the image data (702B). Camera processor 14 may cause the transition between binning levels in response to a desired digital zoom level satisfying a first binning transition threshold. In an illustrative example, image sensor 12 may capture image data using a 2×2 binning level as the second binning level. The first binning transition threshold may be a 2× zoom level relative to the optical zoom level provided by the current lens 13 being used. That is in this example, camera processor 14 may cause image sensor 12 to transition from 4×4 binning to 2×2 binning in response to a zoom level request of 2× zoom.

Next, camera processor 14 may cause image sensor 12 to capture image data using another binning level in response to the zoom level satisfying another predefined binning transition threshold (702C). In the example of FIG. 7, image sensor 12 captures image data using horizontal binning (2×1). Similarly, camera processor 14 may cause image sensor to capture image data using another binning level in response to the zoom level satisfying a different binning transition threshold (702D). In some instances, camera processor 14 may not adapt the binning levels more than a certain number of times. For example, camera processor 14 may only adapt the binning levels from 702A to 702B to 702D, simply using less intermediate binning levels between a maximum binning level and other binning level. In a non-limiting example, image sensor 12 may not use an intermediate binning level between 2×2 binning and non-binning. It should be noted that the pixel diagrams 702A-702D are not necessarily shown to scale as binned pixels. For example, once combining the pixels, the size of 702A would be 16× bigger than the size of 702D because 702A is showing 4×4 pixel binning, whereas 702D is showing non-binning.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where discs usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured to capture image data, the apparatus comprising:

a memory configured to store image data; and one or more processors in communication with the memory, the one or more processors configured to:

cause a first image sensor to capture [a] first one or more frames of the image data using a first image capture mode in the case that a [digital] zoom level is [less] *smaller* than a first [predefined] *binning transition* threshold *and greater than or equal to a first camera transition threshold*, wherein the first image capture mode includes a first binning level that uses [two or more] *four* pixels of the first image sensor for each output pixel of the image data, [and] wherein the first one or more frames of the image data have a first resolution, and *wherein the first image sensor captures the first one or more frames of the image data using* a first color array pattern;

determine that a *first* requested [digital] zoom level [satisfies] *is greater than or equal to* the first [predefined] *binning transition* threshold; and cause the first image sensor to capture [a] second one or more frames of the image data using a second image capture mode, wherein the second image capture mode includes a second binning level that uses [fewer pixels] *one pixel* of the first image sensor [relative to the first binning level] for each output pixel of the image data, wherein the second one or more frames of the image data have the first resolution[and], *wherein the first image sensor captures the second one or more frames of the image data using* the first color array pattern[of the first one or more frames of the image data], and wherein there are no intermediate capture modes between the first image capture mode and the second image capture mode*;*

*determine that a second requested zoom level is smaller than the first camera transition threshold;*

*cause a transition from a first camera comprising the first image sensor to a second camera comprising a second image sensor, wherein the second camera has a different optical zoom level or a different effective focal length than the first camera; and*

*cause the second image sensor to capture third one or more frames of the image data using a third image capture mode, wherein the third image capture mode includes a third binning level that uses one pixel of the second image sensor for each output pixel of the image data,*

*wherein the second image sensor comprises a same number of pixels as a number of pixels output by the first image sensor in the first image capture mode.*

2. The apparatus of claim 1, wherein the one or more processors are further configured to:

determine that [the] *a third* requested [digital] zoom level satisfies a *second* camera transition threshold*, the second camera transition threshold being greater than the first binning transition threshold*;

cause a transition from [a] *the* first camera [comprising the first image sensor] to a [second] *third* camera *comprising a third image sensor, wherein the third camera has a different optical zoom level or a different effective focal length than the first camera and the second camera*; and cause the [second camera] *third image sensor* to capture [a third] *fourth* one or more frames of the image data using [the second] *a fourth* image capture mode, wherein the [second] *fourth* image capture mode [further] includes [using] *a fourth binning level that uses* one [or more pixels] *pixel* of [an] *the third* image sensor [that corresponds to the second camera] for each output pixel of the image data.

3. The apparatus of claim 2, wherein *the second image sensor and* the *third* image sensor [that corresponds to the second camera comprises the first image sensor] *comprise the same number of pixels*.

4. The apparatus of claim 1, wherein the [one or more processors are further configured to:

determine that the requested digital zoom level satisfies a camera transition threshold;

cause a transition from a first camera comprising the first image sensor to a second camera;

cause the second camera to capture a third one or more frames of the image data using the first image capture mode in the case that the requested digital zoom level is less than a second predefined threshold, wherein the first image capture mode further includes using two or more pixels of an image sensor that corresponds to the second camera for each output pixel of the image data;

determine that a second requested digital zoom level satisfies the second predefined threshold; and cause the second camera to capture a fourth one or more frames of the image data using the second image capture mode, wherein the second image capture mode further includes using fewer pixels of the image sensor that corresponds to the second camera relative to the first image capture mode for each output pixel of the image data] *second image sensor and the third image sensor are 12MP image sensors.*

[5. The apparatus of claim 1, wherein to cause the first image sensor to capture the first one or more frames of the image data using the first image capture mode, the one or more processors are configured to cause the first image sensor to combine four pixels of the first image sensor for each output pixel of the image data, and wherein to cause the first image sensor to capture the second one or more frames of the image data using the second image capture mode, the one or more processors are configured to cause the first image sensor to use one pixel of the first image sensor for each output pixel of the image data.]

6. The apparatus of claim [5] *1*, wherein the one or more processors are further configured to:

cause the first image sensor to output a reduced portion of [output] pixels for each of the second one or more frames captured using the second image capture mode, wherein the reduced portion corresponds to a center twenty-five percent of the [output] pixels for each of the second one or more frames captured using the second image capture mode.

7. The apparatus of claim 1, wherein the one or more processors are further configured to:

cause the first image sensor to output a reduced portion of [output] pixels for each of the second one or more frames captured using the second image capture mode; and receive, from the first image sensor, the reduced portion of [output] pixels for the second one or more frames captured using the second image capture mode.

8. The apparatus of claim 7, wherein the reduced portion comprises a predefined percentage of a full field of view of the first image sensor, wherein the full field of view comprises all pixels of the first image sensor.

9. The apparatus of claim 1, wherein the first image capture mode provides a lower pixel density compared to that of the second image capture mode.

[10. The apparatus of claim 1, wherein the one or more processors are further configured to:

determine that the requested digital zoom level satisfies a third predefined threshold; and cause the first image sensor to capture a third one or more frames of the image data using a third image capture mode, wherein the third image capture mode includes a third binning level that uses fewer pixels of the first image sensor relative to the second binning level for each output pixel of the image data.]

[11. The apparatus of claim 10, wherein to cause the first image sensor to capture the first one or more frames of the image data using the first image capture mode, the one or more processors are configured to cause the first image sensor to combine at least five pixels of the first image sensor for each output pixel of the image data, wherein to cause the first image sensor to capture the second one or more frames of the image data using the second image capture mode, the one or more processors are configured to cause the first image sensor to use four pixels of the first image sensor for each output pixel of the image data, and wherein to cause the first image sensor to capture the third one or more frames of the image data using the third image capture mode, the one or more processors are configured to cause the first image sensor to use one pixel of the first image sensor for each output pixel of the image data.]

12. The apparatus of claim 1, wherein the one or more processors are further configured to:

receive the output pixels from the first image sensor; and perform digital cropping to achieve the *first* requested [digital] zoom level using the output pixels.

13. The apparatus of claim 1, wherein the one or more processors are further configured to:

determine that the *first* requested [digital] zoom level [satisfies] *is greater than or equal to* an upsampling threshold, the upsampling threshold [corresponding to a digital zoom level that is less] *being smaller* than the first [predefined] *binning transition* threshold, and wherein the upsampling threshold is based at least in part on a desired resolution parameter; and perform upsampling to achieve the *first* requested [digital] zoom level using the output pixels.

14. The apparatus of claim 1, further comprising:

the first image sensor; and a display.

15. A method of capturing image data comprising:

causing a first image sensor to capture [a] first one or more frames of image data using a first image capture mode in the case that a [digital] zoom level is [less] *smaller* than a first [predefined] *binning transition* threshold *and greater than or equal to a first camera transition threshold*, wherein the first image capture mode includes a first binning level that uses [two or more] *four* pixels of the first image sensor for each output pixel of the image data, [and] wherein the first one or more frames of the image data have a first resolution, and *wherein the first image sensor captures the first one or more frames of the image data using* a first color array pattern;

determining that a *first* requested [digital] zoom level [satisfies] *is greater than or equal to* the first [predefined] *binning transition* threshold; and causing the first image sensor to capture [a] second one or more frames of the image data using a second image capture mode, wherein the second image capture mode includes a second binning level that uses [fewer pixels] *one pixel* of the first image sensor [relative to the first binning level] for each output pixel of the image data, wherein the second one or more frames of the image data have the first resolution[and], *wherein the first image sensor captures the second one or more frames of the image data using* the first color array pattern[of the first one or more frames of the image data], and wherein there are no intermediate capture modes between the first image capture mode and the second image capture mode*;*

*determining that a second requested zoom level is smaller than the first camera transition threshold;*

*causing a transition from a first camera comprising the first image sensor to a second camera comprising a second image sensor, wherein the second camera has a different optical zoom level or a different effective focal length than the first camera; and*

*causing the second image sensor to capture third one or more frames of the image data using a third image capture mode, wherein the third image capture mode includes a third binning level that uses one pixel of the second image sensor for each output pixel of the image data,*

*wherein the second image sensor comprises a same number of pixels as a number of pixels output by the first image sensor in the first image capture mode.*

16. The method of claim 15, further comprising:

determining that [the] *a third* requested [digital] zoom level satisfies a *second* camera transition threshold*, the second camera transition threshold being greater than the first binning transition threshold*;

causing a transition from [a] *the* first camera to a [second] *third* camera *comprising a third image sensor, wherein the third camera has a different optical zoom level or a different effective focal length than the first camera and the second camera*; *and* causing the [second camera] *third image sensor* to capture [a third] *fourth* one or more frames of the image data using [the second] *a fourth* image capture mode, wherein the [second] *fourth* image capture mode [further] includes [using] *a fourth binning level that uses* one [or more pixels] *pixel* of [an] *the third* image sensor [corresponding to the second camera] for each output pixel of the image data.

17. The method of claim 16, wherein [the number of pixels of] *the second image sensor and* the *third* image sensor [corresponding to the second camera that are used for each output pixel is based at least in part on a difference between a total number of pixels of the first image sensor and a total number of pixels of the image sensor corresponding to the second camera] *comprise the same number of pixels*.

18. The method of claim 15, further comprising:

causing the first image sensor to output a reduced portion of [output] pixels for each of the second one or more frames captured using the second image capture mode; and receiving, from the first image sensor, the reduced portion of [output] pixels for the second one or more frames captured using the second image capture mode.

[19. The method of claim 15, further comprising:

determining that the requested digital zoom level satisfies a third predefined threshold;

and causing the first image sensor to capture a third one or more frames of the image data using a third image capture mode, wherein the third image capture mode includes a third binning level that uses fewer pixels of the first image sensor relative to the second binning level for each output pixel of the image data.]

[20. The method of claim 19, wherein causing the first image sensor to capture the first one or more frames of the image data using the first image capture mode comprises causing the first image sensor to combine at least five pixels of the first image sensor for each output pixel of the image data, wherein causing the first image sensor to capture the second one or more frames of the image data using the second image capture mode comprises causing the first image sensor to use four pixels of the first image sensor for each output pixel of the image data, and wherein causing the first image sensor to capture the third one or more frames of the image data using the third image capture mode comprises causing the first image sensor to use one pixel of the first image sensor for each output pixel of the image data.]

21. The method of claim 15, further comprising:

receiving the output pixels *from the first image sensor*; and performing digital cropping to achieve the *first* requested [digital] zoom level using the output pixels.

22. The method of claim 15, further comprising:

determining that the *first* requested [digital] zoom level [satisfies] *is greater than or equal to* an upsampling threshold, the upsampling threshold [corresponding to a requested digital zoom level that is less] *being smaller* than the first [predefined] *binning transition* threshold, and wherein the upsampling threshold is based at least in part on a desired resolution parameter; and performing upsampling to achieve the *first* requested [digital] zoom level using the output pixels.

23. An apparatus configured to capture image data, the apparatus comprising:

means for causing [an] *a first* image sensor to capture [a] first one or more frames of image data using a first image capture mode in the case that a [digital] zoom level is [less] *smaller* than a first [predefined] *binning transition* threshold *and greater than or equal to a first camera transition threshold*, wherein the first image capture mode includes a first binning level that uses [two or more] *four* pixels of [an] *the first* image sensor for each output pixel of the image data, [and] wherein the first one or more frames of the image data have a first resolution, and *wherein the first image sensor captures the first one or more frames of the image data using* a first color array pattern;

means for determining that a *first* requested [digital] zoom level [satisfies] *is greater than or equal to* the first [predefined] *binning transition* threshold; and means for causing the *first* image sensor to capture [a] second one or more frames of the image data using a second image capture mode, wherein the second image capture mode includes a second binning level that uses [fewer pixels] *one pixel* of the *first* image sensor [relative to the first binning level] for each output pixel of the image data, wherein the second one or more frames of the image data have the first resolution[and], *wherein the first image sensor captures the second one or more frames of the image data using* the first color array pattern[of the first one or more frames of the image data], and wherein there are no intermediate capture modes between the first image capture mode and the second image capture mode*;*

*means for determining that a second requested zoom level is smaller than the first camera transition threshold;*

*means for causing a transition from a first camera comprising the first image sensor to a second camera comprising a second image sensor, wherein the second camera has a different optical zoom level or a different effective focal length than the first camera; and*

*means for causing the second image sensor to capture third one or more frames of the image data using a third image capture mode, wherein the third image capture mode includes a third binning level that uses one pixel of the second image sensor for each output pixel of the image data,*

*wherein the second image sensor comprises a same number of pixels as a number of pixels output by the first image sensor in the first image capture mode.*

24. The apparatus of claim 23, the apparatus further comprising:

means for receiving the output pixels from the *first* image sensor; and means for performing digital cropping to achieve the *first* requested [digital] zoom level using the output pixels.

[25. The apparatus of claim 23, wherein the means for causing the image sensor to capture the first one or more frames of the image data using the first image capture mode comprises means for causing the image sensor to combine four pixels of the image sensor for each output pixel of the image data, and wherein the means for causing the image sensor to capture the second one or more frames of the image data using the second image capture mode comprises means for causing the image sensor to use one pixel of the image sensor for each output pixel of the image data.]

[26. The apparatus of claim 23, further comprising:

means for causing the image sensor to output a reduced portion of output pixels for the second one or more frames of the image data; and means for receiving, from the image sensor, the reduced portion of output pixels for the second one or more frames of the image data.]

27. A non-transitory computer-readable storage medium having stored thereon instructions that, when executed, cause one or more processors to:

cause a first image sensor to capture [a] first one or more frames of image data using a first image capture mode in the case that a [digital] zoom level is [less] *smaller* than a first [predefined] *binning transition* threshold *and greater than or equal to a first camera transition threshold*, wherein the first image capture mode includes a first binning level that uses [two or more] *four* pixels of the first image sensor for each output pixel of the image data, [and] wherein the first one or more frames of the image data have a first resolution, and *wherein the first image sensor captures the first one or more frames of the image data using* a first color array pattern;

determine that a *first* requested [digital] zoom level [satisfies] *is greater than or equal to* the first [predefined] *binning transition* threshold; and cause the first image sensor to capture [a] second one or more frames of the image data using a second image capture mode, wherein the second image capture mode includes a second binning level that uses [fewer pixels] *one pixel* of the first image sensor [relative to the first binning level] for each output pixel of the image data, wherein the second one or more frames of the image data have the first resolution[and], *wherein the first image sensor captures the second one or more frames of the image data using* the first color array pattern[of the first one or more frames of the image data], and wherein there are no intermediate capture modes between the first image capture mode and the second image capture mode*;*

*determine that a second requested zoom level is smaller than the first camera transition threshold;*

*cause a transition from a first camera comprising the first image sensor to a second camera comprising a second image sensor, wherein the second camera has a different optical zoom level or a different effective focal length than the first camera; and*

*cause the second image sensor to capture third one or more frames of the image data using a third image capture mode, wherein the third image capture mode includes a third binning level that uses one pixel of the second image sensor for each output pixel of the image data,*

*wherein the second image sensor comprises a same number of pixels as a number of pixels output by the first image sensor in the first image capture mode.*

28. The non-transitory computer-readable storage medium of claim 27, wherein the one or more processors are further configured to:

determine that [the] *a third* requested [digital] zoom level satisfies a *second* camera transition threshold*, the second camera transition threshold being greater than the first binning transition threshold*;

cause a transition from [a] *the* first camera to a [second] *third* camera *comprising a third image sensor, wherein the third camera has a different optical zoom level or a different effective focal length than the first camera and the second camera*; and cause the [second camera] *third image sensor* to capture [the second] *fourth* one or more frames of the image data using [the second] *a fourth* image capture mode, wherein the [second] *fourth* image capture mode [further] includes [using] *a fourth binning level that uses* one [or more pixels] *pixel* of [an] *the third* image sensor [that corresponds to the second camera] for each output pixel of the image data.

29. The non-transitory computer-readable storage medium of claim 27, wherein the instructions, when executed, further cause one or more processors to at least:

receive the output pixels *from the first image sensor*; and perform digital cropping to achieve the *first* requested [digital] zoom level using the output pixels.

[30. The non-transitory computer-readable storage medium of claim 27, wherein the instructions, when executed, further cause one or more processors to at least:

cause the first image sensor to capture the first one or more frames of the image data using the first image capture mode by causing the first image sensor to combine four pixels of the first image sensor for each output pixel of the image data, and cause the first image sensor to capture the second one or more frames of the image data using the second image capture mode by causing the first image sensor to use one pixel of the first image sensor for each output pixel of the image data.]

[31. The non-transitory computer-readable storage medium of claim 27, wherein the instructions, when executed, further cause one or more processors to at least:

cause the first image sensor to output a reduced portion of output pixels for each of the second one or more frames captured using the second image capture mode; and receive, from the first image sensor, the reduced portion of output pixels for the second one or more frames captured using the second image capture mode.]

*32. The method of claim 15, wherein the second image sensor and the third image sensor are 12MP image sensors.*

*33. The method of claim 15, further comprising:*

*causing the first image sensor to output a reduced portion of pixels for each of the second one or more frames captured using the second image capture mode, wherein the reduced portion corresponds to a center twenty-five percent of the pixels for each of the second one or more frames captured using the second image capture mode.*

*34. The method of claim 18, wherein the reduced portion comprises a predefined percentage of a full field of view of the first image sensor, wherein the full field of view comprises all pixels of the first image sensor.*

*35. The method of claim 15, wherein the first image capture mode provides a lower pixel density compared to that of the second image capture mode.*

*36. The apparatus of claim 23, further comprising:*

*means for determining that a third requested zoom level satisfies a second camera transition threshold, the second camera transition threshold being greater than the first binning transition threshold;*

*means for causing a transition from the first camera to a third camera comprising a third image sensor, wherein the third camera has a different optical zoom level or a different effective focal length than the first camera and the second camera;*

*means for causing the third image sensor to capture fourth one or more frames of the image data using a fourth image capture mode, wherein the fourth image capture mode includes a fourth binning level that uses one pixel of the third image sensor for each output pixel of the image data.*

*37. The apparatus of claim 36, wherein the second image sensor and the third image sensor comprise the same number of pixels.*

*38. The apparatus of claim 23, further comprising:*

*means for causing the first image sensor to output a reduced portion of pixels for each of the second one or more frames captured using the second image capture mode; and*

*means for receiving, from the first image sensor, the reduced portion of pixels for the second one or more frames captured using the second image capture mode.*

*39. The method of claim 38, wherein the reduced portion comprises a predefined percentage of a full field of view of the first image sensor, wherein the full field of view comprises all pixels of the first image sensor.*

*40. The apparatus of claim 23, further comprising:*

*means for determining that the first requested zoom level is greater than or equal to an upsampling threshold, the upsampling threshold being smaller than the first binning transition threshold, and wherein the upsampling threshold is based at least in part on a desired resolution parameter; and*

*means for performing upsampling to achieve the first requested zoom level using the output pixels.*

*41. The apparatus of claim 23, wherein the second image sensor and the third image sensor are 12MP image sensors.*

*42. The apparatus of claim 23, further comprising:*

*means for causing the first image sensor to output a reduced portion of pixels for each of the second one or more frames captured using the second image capture mode, wherein the reduced portion corresponds to a center twenty-five percent of the pixels for each of the second one or more frames captured using the second image capture mode.*

*43. The apparatus of claim 23, wherein the first image capture mode provides a lower pixel density compared to that of the second image capture mode.*

*44. The non-transitory computer-readable storage medium of claim 28, wherein the second image sensor and the third image sensor comprise the same number of pixels.*

*45. The non-transitory computer-readable storage medium of claim 27, wherein the second image sensor and the third image sensor are 12MP image sensors.*

*46. The non-transitory computer-readable storage medium of claim 27, wherein the instructions further cause the one or more processors to:*

*cause the first image sensor to output a reduced portion of pixels for each of the second one or more frames captured using the second image capture mode, wherein the reduced portion corresponds to a center twenty-five percent of the pixels for each of the second one or more frames captured using the second image capture mode.*

*47. The non-transitory computer-readable storage medium of claim 27, wherein the instructions further cause the one or more processors to:*

*cause the first image sensor to output a reduced portion of pixels for each of the second one or more frames captured using the second image capture mode; and*

*receive, from the first image sensor, the reduced portion of pixels for the second one or more frames captured using the second image capture mode.*

*48. The non-transitory computer-readable storage medium of claim 47, wherein the reduced portion comprises a predefined percentage of a full field of view of the first image sensor, wherein the full field of view comprises all pixels of the first image sensor.*

*49. The non-transitory computer-readable storage medium of claim 27, wherein the first image capture mode provides a lower pixel density compared to that of the second image capture mode.*

*50. The non-transitory computer-readable storage medium of claim 27, wherein instructions further cause the one or more processors to:*

*determine that the first requested zoom level is greater than or equal to an upsampling threshold, the upsampling threshold being smaller than the first binning transition threshold, and wherein the upsampling threshold is based at least in part on a desired resolution parameter; and*

*perform upsampling to achieve the first requested zoom level using the output pixels.*

* * * * *